United States Patent
Lee et al.

(10) Patent No.: US 10,243,929 B2
(45) Date of Patent: Mar. 26, 2019

(54) UPLINK CONTROL CHANNEL SCHEDULING FOR JAMMING RESILIENCE

(71) Applicant: QUALCOMM Incorporated, San Diego, CA (US)

(72) Inventors: Soo Bum Lee, San Diego, CA (US); Keiichi Kubota, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 15/256,352

(22) Filed: Sep. 2, 2016

(65) Prior Publication Data
US 2017/0289108 A1    Oct. 5, 2017

Related U.S. Application Data

(60) Provisional application No. 62/315,367, filed on Mar. 30, 2016.

(51) Int. Cl.
*H04L 29/06*    (2006.01)
*H04L 5/00*    (2006.01)
(Continued)

(52) U.S. Cl.
CPC ........ *H04L 63/0428* (2013.01); *H04L 5/0055* (2013.01); *H04L 63/06* (2013.01);
(Continued)

(58) Field of Classification Search
CPC ... H04L 63/0428; H04L 5/0055; H04L 63/06; H04L 63/166; H04W 76/27;
(Continued)

(56) References Cited

U.S. PATENT DOCUMENTS

| 8,036,672 | B2 | 10/2011 | Laroia et al. |
| 8,977,254 | B2 * | 3/2015 | Mueck .................... H04W 8/22 455/418 |

(Continued)

FOREIGN PATENT DOCUMENTS

| WO | WO-2015024215 A1 | 2/2015 |
| WO | WO2016034196 A1 | 3/2016 |

OTHER PUBLICATIONS

ISA/EP, International Search Report and Written Opinion of the International Searching Authority, Int'l Application No. PCT/US2017/024826, dated Jul. 17, 2017, European Patent Office, Rijswijk, NL, 14 pgs.

(Continued)

*Primary Examiner* — Mahfuzur Rahman
(74) *Attorney, Agent, or Firm* — Holland & Hart LLP

(57) ABSTRACT

Methods, systems, and devices for wireless communication are described. The methods, systems, and devices may provide for a time varying allocation of resources which includes a shared pattern of resources. The shared pattern of resources may be generated, determined, or otherwise identified by a base station and transmitted to the user equipment (UE). The shared pattern of resources may include one or more resource blocks (RBs) allocated for uplink transmission such as uplink control information to be transmitted using a physical uplink control channel (PUCCH) or uplink data transmissions using a physical uplink shared channel (PUSCH).

26 Claims, 17 Drawing Sheets

(51) Int. Cl.
*H04W 12/04* (2009.01)
*H04W 72/04* (2009.01)
*H04W 72/12* (2009.01)
*H04W 76/27* (2018.01)

(52) U.S. Cl.
CPC .......... *H04L 63/166* (2013.01); *H04W 12/04* (2013.01); *H04W 72/0413* (2013.01); *H04W 72/1289* (2013.01); *H04W 76/27* (2018.02); *H04W 72/042* (2013.01); *H04W 72/1284* (2013.01)

(58) Field of Classification Search
CPC .............. H04W 72/0413; H04W 12/04; H04W 72/1289; H04W 72/1284; H04W 72/042
See application file for complete search history.

(56) References Cited

U.S. PATENT DOCUMENTS

| | | | |
|---|---|---|---|
| 9,025,556 B2 | 5/2015 | Krishnamurthy et al. | |
| 9,088,385 B2 | 7/2015 | Yu et al. | |
| 9,143,289 B2 * | 9/2015 | Gao | H04L 5/0007 |
| 9,154,283 B2 * | 10/2015 | Johansson | H04L 5/0053 |
| 9,332,542 B2 | 5/2016 | Heo et al. | |
| 9,854,569 B2 * | 12/2017 | Yang | H04W 72/0413 |
| 2008/0069046 A1 * | 3/2008 | Ishii | H04L 47/14 |
| | | | 370/330 |
| 2008/0096571 A1 * | 4/2008 | Pedersen | H04L 1/1887 |
| | | | 455/450 |
| 2009/0290549 A1 * | 11/2009 | Tiirola | H04L 5/0053 |
| | | | 370/329 |
| 2010/0037113 A1 * | 2/2010 | Maheshwari | H04L 1/1812 |
| | | | 714/748 |
| 2015/0092702 A1 * | 4/2015 | Chen | H04W 72/082 |
| | | | 370/329 |

OTHER PUBLICATIONS

Research in Motion et al., "Relay Control Signalling Resource Coordination," 3GPP TSG RAN WG1 Meeting #55-bis, R1-090027, Ljubljana, Slovenia, Jan. 12-16, 2009, 3 pgs., XP050317975, 3rd Generation Partnership Project.

* cited by examiner

10,243,929 B2

UPLINK CONTROL CHANNEL SCHEDULING FOR JAMMING RESILIENCE

CROSS REFERENCES

The present application for patent claims priority to U.S. Provisional Patent Application No. 62/315,367 by LEE, et al., entitled "UPLINK CONTROL CHANNEL SCHEDULING FOR JAMMING RESILIENCE," filed Mar. 30, 2016, assigned to the assignee hereof.

BACKGROUND

The following relates generally to wireless communication, and more specifically to uplink control channel scheduling for jamming resilience.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as user equipments (UEs).

At times, a wireless communications system may be vulnerable to a variety of insecurities. Many association, authentication, and verification processes may exist that are designed to help mitigate or prevent such insecurities. However, in some cases, a wireless communications system may be vulnerable to attacks from a jamming device. The jamming device may overload, or otherwise interfere with, resources (e.g., time, frequency, etc.) of the wireless communications system for the purpose of disrupting communication between base stations and UEs. For example, a jamming device may determine identifiers associated with a UE and may then transmit signals that jam uplink and/or downlink radio resources used by a UE for communication with a base station.

The jamming device may have limited power and signal strength, and often cannot identify the precise location of all the UEs in a wireless communications system. Such a jamming device may not be capable of disrupting the entire radio spectrum or the entire coverage area of a wireless communications system, but may instead launch a targeted jamming attack directed toward specific devices. As uplink information for multiple UEs may be allocated to the same resources, the jamming device may target these resources to disrupt communication for multiple, or sometimes all, UEs connected to a base station.

SUMMARY

The described techniques relate to improved methods, systems, devices, or apparatuses that support uplink control channel scheduling for jamming resilience. Generally, the described techniques provide a shared pattern of resources that may vary over time. The shared pattern of resources may be shared between a base station and one or more user equipments (UEs). The shared pattern of resources may be allocated for transmission of uplink control information (UCI) from the UEs to the base station and may also include allocation of resources for a physical uplink control channel (PUCCH) and a physical uplink shared channel (PUSCH). Using the shared pattern of resources, a UE may transmit UCI or other uplink (UL) packets to the base station without disruption from a jamming attack.

A method of wireless communication is described. The method may include receiving an encoded message from a base station, obtaining, from the encoded message, a time varying allocation of resources including a shared pattern of resources allocated for uplink control information and transmitting uplink control information based at least in part on the shared pattern of resources.

An apparatus for wireless communication is described. The apparatus may include means for receiving an encoded message from a base station, means for obtaining, from the encoded message, a time varying allocation of resources including a shared pattern of resources allocated for UCI and means for transmitting UCI based at least in part on the shared pattern of resources.

A further apparatus is described. The apparatus may include a processor, memory in electronic communication with the processor, and instructions stored in the memory. The instructions may be operable to cause the processor to receive an encoded message from a base station, obtain, from the encoded message, a time varying allocation of resources including a shared pattern of resources allocated for UCI and transmit UCI based at least in part on the shared pattern of resources.

A non-transitory computer readable medium for wireless communication is described. The non-transitory computer-readable medium may include instructions to cause a processor to receive an encoded message from a base station, obtain, from the encoded message, a time varying allocation of resources including a shared pattern of resources allocated for UCI and transmit UCI based at least in part on the shared pattern of resources.

Some examples of the method, apparatus, or non-transitory computer-readable medium described above may further include processes, features, means, or instructions for obtaining, from the encoded message, at least one of a hopping sequence, or a periodicity, or a time period, or a combination thereof associated with the time varying allocation of resources.

Some examples of the method, apparatus, or non-transitory computer-readable medium described above may further include processes, features, means, or instructions for establishing a secure radio resource control (RRC) channel with the base station, where receiving the encoded message includes receiving the encoded message using the secure RRC channel.

In some examples of the method, apparatus, or non-transitory computer-readable medium described above, receiving the encoded message from the base station includes receiving an encrypted physical downlink control channel (PDCCH) message including the time varying allocation of resources.

In some examples of the method, apparatus, or non-transitory computer-readable medium described above, the time varying allocation of resources for UCI includes resource allocation for at least one of a physical uplink control channel (PUCCH), or a physical uplink shared channel (PUSCH), or a combination thereof associated with the client device.

In some examples of the method, apparatus, or non-transitory computer-readable medium described above, obtaining the time varying allocation of resources includes decrypting the encrypted PDCCH message using an encryption key. In some examples of the method, apparatus, or non-transitory computer-readable medium described above, the encryption key is obtained from the base station using a secure RRC channel.

In some examples of the method, apparatus, or non-transitory computer-readable medium described above, the encryption key is derived by the client device based on a key shared with the base station. In some examples of the method, apparatus, or non-transitory computer-readable medium described above, the UCI includes at least one of a scheduling request (SR), or an acknowledgement (ACK) message, or a negative ACK (NACK) message, or a channel state information (CSI), or a combination thereof.

In some examples of the method, apparatus, or non-transitory computer-readable medium described above, the CSI includes at least one of a channel quality indicator (CQI), or a precoding matrix indicator (PMI), or a precoding type indicator (PTI), or a rank indication (RI), or a combination thereof. In some examples of the method, apparatus, or non-transitory computer-readable medium described above, the ACK message includes a hybrid automatic repeat request (HARQ) ACK message and the NACK message includes a HARQ NACK message.

A method of wireless communication is described. The method may include identifying a time varying allocation of resources including a shared pattern of resources allocated for UCI of a client device, generating an encoded message including the identified time varying allocation of resources and transmitting the encoded message to the client device.

An apparatus for wireless communication is described. The apparatus may include means for identifying a time varying allocation of resources including a shared pattern of resources allocated for UCI of a client device, means for generating an encoded message including the identified time varying allocation of resources and means for transmitting the encoded message to the client device.

A further apparatus is described. The apparatus may include a processor, memory in electronic communication with the processor, and instructions stored in the memory. The instructions may be operable to cause the processor to identify a time varying allocation of resources including a shared pattern of resources allocated for UCI of a client device, generate an encoded message including the identified time varying allocation of resources and transmit the encoded message to the client device.

A non-transitory computer readable medium for wireless communication is described. The non-transitory computer-readable medium may include instructions to cause a processor to identify a time varying allocation of resources including a shared pattern of resources allocated for UCI of a client device, generate an encoded message including the identified time varying allocation of resources and transmit the encoded message to the client device.

Some examples of the method, apparatus, or non-transitory computer-readable medium described above may further include processes, features, means, or instructions for establishing a secure RRC channel with the client device, where transmitting the encoded message includes transmitting the encoded message using the secure RRC channel.

Some examples of the method, apparatus, or non-transitory computer-readable medium described above may further include processes, features, means, or instructions for identifying at least one of a hopping sequence, or a periodicity, or a time period, or a combination thereof associated with the time varying allocation of resources, where the encoded message further includes at least one of the identified hopping sequence, or the identified periodicity, or the identified time period, or a combination thereof.

In some examples of the method, apparatus, or non-transitory computer-readable medium described above, the time varying allocation of resources includes one or more resource blocks (RBs) allocated for transmission of UCI for the client device. In some examples of the method, apparatus, or non-transitory computer-readable medium described above, the one or more RBs allocated for transmission of UCI are randomly selected by the base station.

Some examples of the method, apparatus, or non-transitory computer-readable medium described above may further include processes, features, means, or instructions for transmitting, to the client device, an encrypted PDCCH message including the identified time varying allocation of resources.

In some examples of the method, apparatus, or non-transitory computer-readable medium described above, the time varying allocation of resources includes resource allocation for at least one of a PUCCH, or a PUSCH, or a combination thereof associated with the client device. In some examples of the method, apparatus, or non-transitory computer-readable medium described above, generating the encrypted PDCCH message includes: encrypting a PDCCH message using an encryption key.

Some examples of the method, apparatus, or non-transitory computer-readable medium described above may further include processes, features, means, or instructions for transmitting the encryption key to the client device using a secure RRC message. In some examples of the method, apparatus, or non-transitory computer-readable medium described above, the encryption key is based on a key shared with the client device.

Some examples of the method, apparatus, or non-transitory computer-readable medium described above may further include processes, features, means, or instructions for receiving UCI from the client device based on the identified time varying allocation of resources. In some examples of the method, apparatus, or non-transitory computer-readable medium described above, the UCI includes at least one of an SR, or an ACK message, or a NACK message, or a CSI, or a combination thereof.

Some examples of the method, apparatus, or non-transitory computer-readable medium described above, CSI includes at least one of a CQI, or a PMI, or a PTI, or an RI, or a combination thereof.

DETAILED DESCRIPTION

Mechanisms for jamming resilience implemented in a wireless communications system of a wireless network may be used to prevent or limit jamming attacks from a device seeking to attack other devices in the wireless network. For example, a base station and a wireless device (e.g., a user equipment (UE)) may utilize a time varying allocation of resources (e.g., time and frequency resources allocated to UEs for transmission and/or reception). The time varying allocation of resources may be for uplink control information (UCI) to be transmitted from a UE to a base station. In one or more implementations, the allocation of resources information may be randomized, periodic, or otherwise unfixed, and may be used to prevent a jamming device from successfully jamming a known set of resources allocated for UEs of the wireless communications system.

In one example of jamming resilience implemented in a wireless network, the time varying allocation of resources may include a shared pattern of resources. The shared pattern of resources may be generated, determined, or otherwise identified by the base station and transmitted to the UE using a secure radio channel (e.g., a secure radio resource control (RRC) channel). In some examples, the entirety of the shared pattern of resources may be allocated to a single device, or may be divided between multiple devices. In another aspect, the time varying allocation of resources may be transmitted from the base station to the UE using a physical downlink control channel (PDCCH). In some examples, the PDCCH message may be encrypted by the base station using an encryption key. The encryption key may be common to multiple UEs connected to the base station or may be a device specific key shared with the UE. Beneficially, the examples described herein may change uplink control resources (e.g., PUCCH resources) for devices over time to increase security and securely indicate the time-varying uplink control resources to avoid jamming of the UE on the uplink.

Features of the disclosure introduced above are further described below in the context of a wireless communications system. Specific examples are then described of example process flows for mechanisms jamming resilience in a network. These and other features of the disclosure are further illustrated by and described with reference to apparatus diagrams, system diagrams, and flowcharts that relate to mechanisms for jamming resilience in a network.

Figure 1:
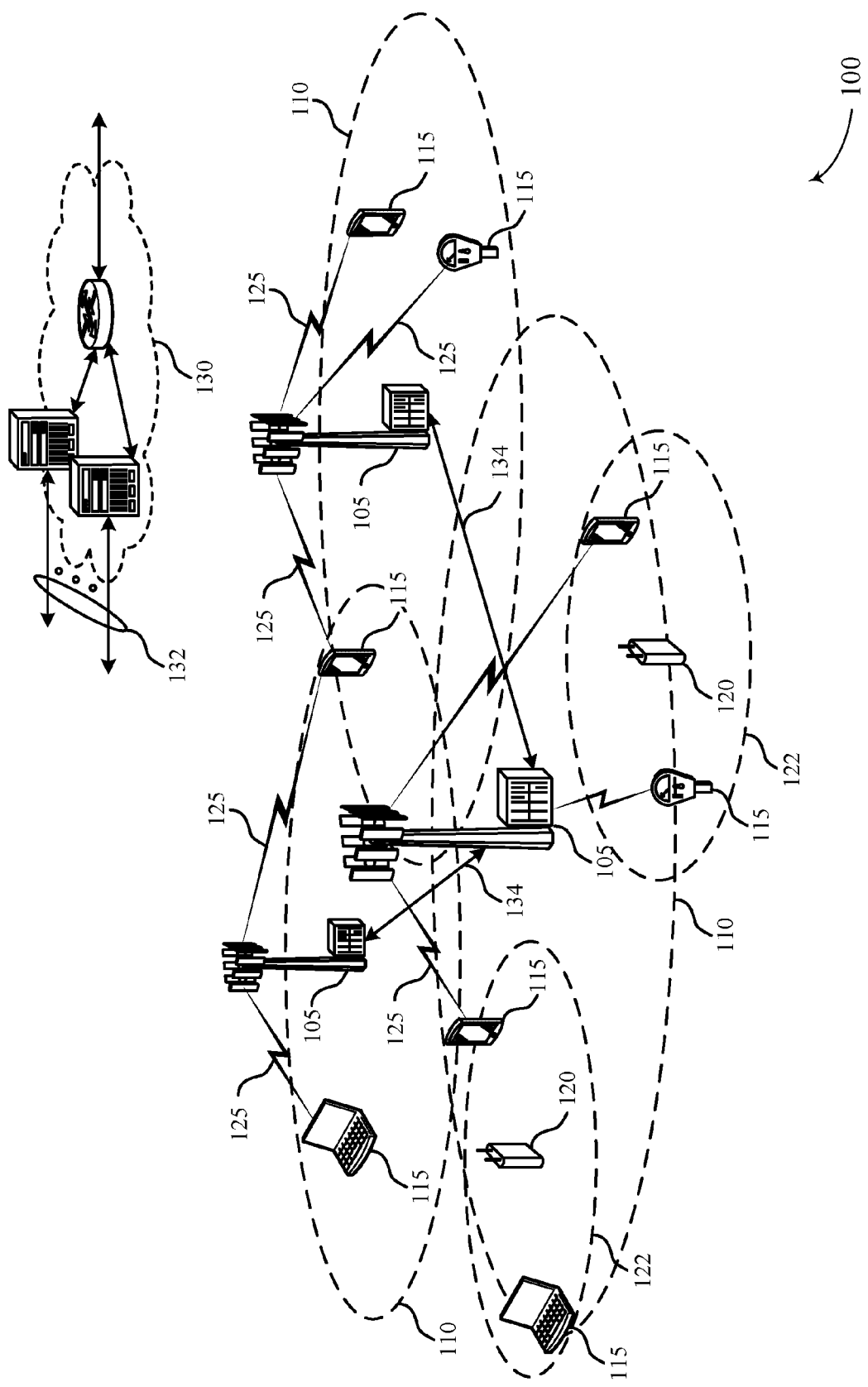
FIG. 1 illustrates an example of a wireless communications system that supports uplink control channel scheduling for jamming resilience in accordance with aspects of the present disclosure.

FIG. 1 illustrates an example of a wireless communications system 100 that supports jamming resilience in accordance with various aspects of the present disclosure. The wireless communications system 100 includes base stations 105, UEs 115, and a core network 130. In some examples, the wireless communications system 100 may be a Long Term Evolution (LTE) network, a LTE-Advanced (LTE-A) network, a new radio (NR) network, a 5G network, a network supporting Ultra-Reliable and Low-Latency Communications (URLLC), or the like. In NR or 5G networks, the base stations 105 may include access nodes (ANs), central units (CUs), and/or distributed units (DUs). An AN may be an example of a new radio base station (NR BS), a new radio Node-B (NR NB), a network node (NN), or the like. A CU may be an example of a central node (CN), an access node controller (ANC), or the like. A DU may be an example of an edge node (EN), an edge unit (EU), a radio head (RH), a smart radio head (SRH), a transmission and reception point (TRP), or the like.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, a client device, or like terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and may generate scheduling information for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Some types of wireless devices may provide for automated communication. Automated wireless devices may include those implementing Machine-to-Machine (M2M) communication or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

In some cases, a base station 105 and a user equipment (UE) 115 may communicate using carrier frequencies at 6 GHz or less (sub-6), or higher such as 28 GHz, 60 GHz, etc. which is also known as millimeter wave communications. Each component can have a bandwidth of, e.g., 1.4, 3, 5, 10, 15, 20 MHz, etc. In some cases, a base station 105 and a UE 115 may communicate using more than one carrier in a carrier aggregation (CA) configuration. Each aggregated carrier is referred to as a component carrier (CC). In some cases, the number of CCs can be limited to, e.g., a maximum of five 20 MHz carriers, giving maximum aggregated bandwidth of 100 MHz. In frequency division duplexing (FDD), the number of aggregated carriers can be different in downlink (DL) and uplink (UL). The number of UL component carriers may be equal to or lower than the number of DL component carriers. The individual component carriers can also be of different bandwidths. For time division duplexing (TDD), the number of CCs as well as the bandwidths of each CC will normally be the same for DL and UL. Component carriers may be arranged in a number of ways. For example, a carrier aggregation (CA) configuration may be based at least in part on contiguous component carriers within the same operating frequency band, i.e., called intra-band contiguous CA. Non-contiguous allocations can also be used, where the component carriers may be either be intra-band, or inter-band.

Within a CA configuration, certain CCs may be configured differently from other CCs of the CA configuration. For example, the CA configuration may include a primary CC (PCC or PCell) and one or several secondary CCs (SCC or SCell). The PCell may be configured to carry uplink and downlink control information on PUCCH and PDCCH/ePDCCH, respectively. PDCCH on a PCell may include scheduling information for resources of the PCell or for resources of one or more SCells, or both. An SCell may include PDCCH, which may include scheduling information for resources of that SCell or for one or more other SCells. Some SCells may be configured for downlink communications and may not be configured for uplink communications, while a PCell may be configured for both uplink and downlink communications. Various carriers of the CA may be TDD or FDD configured. A CA configuration may include both TDD and FDD configured carriers.

In some cases, wireless communications system 100 may utilize enhanced component carriers (eCCs). In some examples, NR or 5G networks may utilize eCCs, and the use of eCCs over a shared spectrum may be referred to as New Radio for Shared Spectrum (NR-SS). An SCell may, for instance, be an eCC. An eCC may be characterized by one or more features including: wider bandwidth, shorter symbol duration, shorter transmission time intervals (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A UE 115 may include a subscriber information module (SIM), which may be an integrated circuit (IC) that securely stores the international mobile subscriber identity (IMSI) and a related key used to identify and authenticate the UE 115. A SIM may also contain a unique serial number (e.g., an IC card identification (ID) (ICCID)), security authentication and ciphering information, temporary information related to the local network, a list of the services, a personal ID number (PIN), and a personal unblocking code (PUK) for PIN unlocking. In some cases, a SIM may be a circuit embedded in a removable card.

Wireless communications system 100 may be used to support the internet-of-things (IoT), which may be used to refer to a network of physical objects that autonomously collect and exchange data with one another. In some examples, the wireless communications system 100 may be vulnerable to insecurities, such an attack directed toward one or more UEs 115 and/or one or more base stations 105 and designed to overload or interfere with resources of the wireless communications system 100.

In some examples, devices (e.g., base station 105, UE 115) within the wireless communications system 100 may be subject to jamming attacks caused by one or more jamming devices 120. A jamming device 120 may be located within or near the wireless communications system 100 and may launch an attack on specific UEs 115 or base stations 105 by identifying resources used for communication between the specific UEs 115 and/or base stations 105. For instance, the jamming device 120 may determine an uplink control region (e.g., time and/or frequency resources allocated for uplink control information for one or more UEs) of the system. In some cases, the jamming device 120 may determine that uplink control information is scheduled based on the system bandwidth. For example, uplink control information for one or more UEs may be scheduled to be transmitted in a first time slot at one end of the system bandwidth and/or in a second time slot (e.g., a time slot consecutive to the first time slot) at the other end of the system bandwidth. By determining the resources (resource elements (REs), resource blocks (RBs), subcarriers, time slots, symbols, etc.) allocated for uplink control information, the jamming device 120 may then transmit signals within a jamming coverage area 122 and/or toward a base station 105 to overload or otherwise interfere with the resources allocated for one or more UEs 115 of the wireless communications system 100. In doing so, the jamming device 120 could jeopardize the reception and/or transmission of critical messages, channels, and/or timings between the base station 105 and one or more UEs 115.

Accordingly, in order to protect against attacks from one or more jamming devices 120, wireless devices in a wireless communications system 100, such as a base station 105 and/or a UE 115, may include uplink control managers to allocate resources for uplink control information based on a pattern of resources (resource elements (REs), resource blocks (RBs), time slots, symbols, etc.) that may vary over time.

Figure 2A:
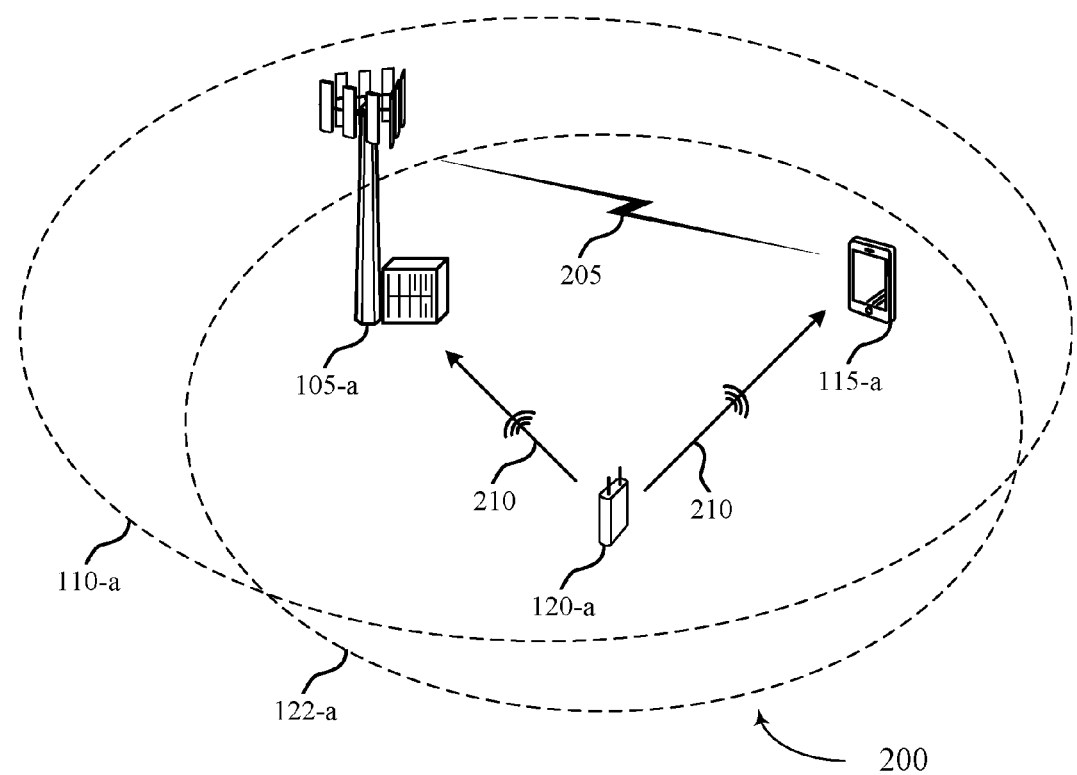
FIG. 2A illustrates an example of a wireless communications system that supports uplink control channel scheduling for jamming resilience in accordance with aspects of the present disclosure.

FIG. 2A illustrates an example of a wireless communications system 200 for uplink control channel scheduling for jamming resilience. Wireless communications system 200 may include base station 105-*a* and UE 115-*a*, which may be examples of the corresponding devices described with reference to FIG. 1. In some implementations, the base station 105-*a* and the UE 115-*a* may include uplink control managers.

The base station 105-*a* may provide communication coverage for a coverage area 110-*a* and the UE 115-*a* may connect to, or at least attempt connection to, the base station 105-*a*. The UE 115-*a* may be connected to or attempt to connect to the base station 105-*a* once the UE 115-*a* is located within base station coverage area 110-*a* or prior to entering the coverage area 110-*a* (e.g., if the UE 115-*a* is traveling toward the coverage area 110-*a*). In some examples, the UE 115-*a* may start a connection process with the base station 105-*a* by sending an attach request. Based on the attach request, the base station 105-*a* may facilitate authentication and/or authorization of the UE 115-*a* through the core network (e.g., core network 130 in FIG. 1). Once authenticated, the UE 115-*a* may communicate with the core network based on a non-access stratum (NAS) protocol configured to securely establish and maintain connectivity between the UE 115-*a* and the core network. One or more core network nodes (e.g., a mobile management entity (MME), serving gateway, etc.) may inform the base station 105-*a* that the UE 115-*a* is authenticated and authorized to connect to the wireless communications system 200. Thereafter, the base station 105-*a* may establish an RRC connection with the UE 115-*a* (e.g., based on an access stratum (AS) protocol).

To establish an RRC connection, the base station 105-*a* may generate and transmit a security configuration to the UE 115-*a* during the execution of the AS protocol or after the AS protocol has been performed. In some examples, the security configuration may be transmitted to the UE 115-*a* over a secure radio channel (e.g., a secure RRC channel), which may be established based at least in part on a shared key associated with the base station 105-*a* and the UE 115-*a*. In some examples, the shared key may be an eNB key (KeNB) transmitted to the base station 105-*a* by a core network node (e.g., during or subsequent to the authentication and key agreement (AKA) process) and/or derived by the UE 115-*a*.

According to some aspects, the base station 105-*a* may include an uplink control manager used to identify an allocation of resources for transmission of uplink control information for the UE 115-*a*. The allocation of resources may include a shared pattern of resources, which may be shared between the base station 105-*a* and the UE 115-*a*. The shared pattern of resources may be periodic in which one or more resources allocated to the UE 115-*a* may repeat throughout the time domain or frequency domain. The allocation of resources may also include a hopping sequence that identifies the specific resources allocated for uplink control information for the UE 115-*a*.

In some cases, the allocation of resources may vary over time. For example, a certain shared pattern of resources may be allocated for uplink control information for UE 115-*a* for a first time period and at the expiration of the first time period, a different shared pattern of resources may be allocated for uplink control information for UE 115-*a* for a second time period. Multiple shared patterns may be allocated for a given UE 115-*a* over the time in which the UE 115-*a* is connected to the base station 105-*a*.

The base station 105-*a* may then generate an encoded message that includes the allocation of resources and in particular, the shared pattern of resources allocated for uplink control information for the UE 115-*a*. In one example, the encoded message may be encrypted based on the shared key and provided to the UE 115-*a* over a secure RRC channel. In another example, the encoded message may be encrypted in a PDCCH message. The encrypted PDCCH message may be encrypted using an encryption key. The encryption key may be transmitted from the base station 105-*a* to the UE 115-*a* during the RRC connection and/or may be transmitted over a secure RRC channel (e.g., after an RRC connection is established). Using the secure RRC channel may prevent other devices, such as jamming device 120, from intercepting the encryption key. In some examples, the encryption key may be common to all UEs 115-*a* connected to or attempting to connect to the base station 105-*a*. In some cases, the encryption key may be randomly generated by the base station 105-*a* or the core network. In some examples, the encryption key may be derived based on a shared key associated with the base station 105-*a* and the UE 115-*a*, such as a KeNB.

Further, the encrypted PDCCH message may include a message authentication code (MAC) used to verify the integrity of the PDCCH message. In some instances, the MAC may be computed based on a PDCCH integrity protection key. The PDCCH integrity protection key may be common to all UEs 115-*a* connected to or attempting to connect to the base station 105-*a*. In other examples, the PDCCH integrity protection key may be unique to each UE 115-*a* of the wireless communications system 200. Other implementations of integrity protection may include using a CRC or replacing a CRC checksum with the MAC. In some examples, the PDCCH integrity protection key may be the same as the PDCCH encryption key, may be derivable from the PDCCH encryption key, or may be derivable from a shared key associated with the base station 105-*a* and the UE 115-*a*.

In either case, the base station 105-*a* may then transmit the encoded message to the UE 115-*a* over communication link 205. The transmission may include the allocation of resources and the shared pattern of resources allocated for uplink control information for UE 115-*a*. The communication link 205 may be similar to communication links 125 as discussed with respect to FIG. 1. The communication link 205 may be a secure RRC channel over which a PDCCH encryption key may be transmitted. The communication link 205 may be a broadcast, multicast, or unicast channel for communication between the base station 105-*a* and the UE 115-*a*. Using the secure RRC channel may prevent other devices, such as jamming device 120, from intercepting the encoded message, and from retrieving the allocation of resources and the shared pattern of resources from the encoded message.

The UE uplink control manager may receive the encoded message transmitted by the base station 105-*a*. Using the received encoded message, the UE 115-*a* may obtain the time varying allocation of resources including the shared pattern of resource allocated for uplink control information. For example, the UE 115-*a* may decode the encoded message from the base station 105-*a* to obtain the allocation of resources.

In some examples, as discussed above, the encoded message may be included in an encrypted PDCCH message.

In such cases, the UE 115-*a* may determine, generate, or otherwise obtain an encryption key associated with the PDCCH message. For example, the PDCCH encryption key may be derived by the UE 115-*a* based on a shared key associated with the UE 115-*a* and the base station 105-*a* or may be transmitted from the base station 105-*a* to the UE 115-*a* (e.g., over a secure RRC channel). Using the encryption key, the UE 115-*a* may decrypt the encrypted PDCCH message to obtain the allocation of resources. In some examples, the UE 115-*a* may decrypt the encrypted PDCCH message to obtain an encoded message and may then decode the encoded message to obtain the allocation of resources. After obtaining the PDCCH encryption key, the UE 115-*a* may decrypt a PDCCH message transmitted (e.g., transmitted over communication link 205) from the base station 105-*a* to the UE 115-*a*.

After obtaining the allocation of resources including the shared pattern of resources allocated for uplink control information, the UE 115-*a* may then transmit uplink control information to the base station 105-*a*. The uplink control information may include at least one of a scheduling request (SR), an acknowledgement (ACK) message, a negative ACK (NACK) message, a channel state information (CSI), or a combination thereof.

An SR may be transmitted from the UE 115-*a* to the base station 105-*a* to indicate that the UE 115-*a* has data to transmit. An ACK or a NACK message may be transmitted by the UE 115-*a* to the base station 105-*a* in response to receiving a message from the base station 105-*a*. The ACK message may be transmitted if the UE 115-*a* has successfully received and decoded the message sent by the base station 105-*a*, whereas a NACK message may be transmitted if the transmission from the base station 105-*a* was not successfully received and decoded. These messages may be transmitted during a retransmission procedure, such as a hybrid automatic repeat request (HARD) procedure for retransmission of previously unsuccessfully received signals. CSI may be used as feedback to the base station 105-*a* and may include a channel quality indicator (CQI), which may be based on signal to noise ratios, for example. CSI may also include other indicators such as a precoding matrix indicator (PMI), a precoding type indicator (PTI), and/or rank indication (RI). The PMI and PTI may indicate to the base station 105-*a* what precoding matrix and type should be used when encoding downlink signals, which may also be determined in part by the RI.

In accordance with the present disclosure, the wireless communications system 200 implementing the techniques described above may prevent or limit jamming attacks from jamming signals 210 transmitted by a jamming device 120-*a*.

Figure 2B:
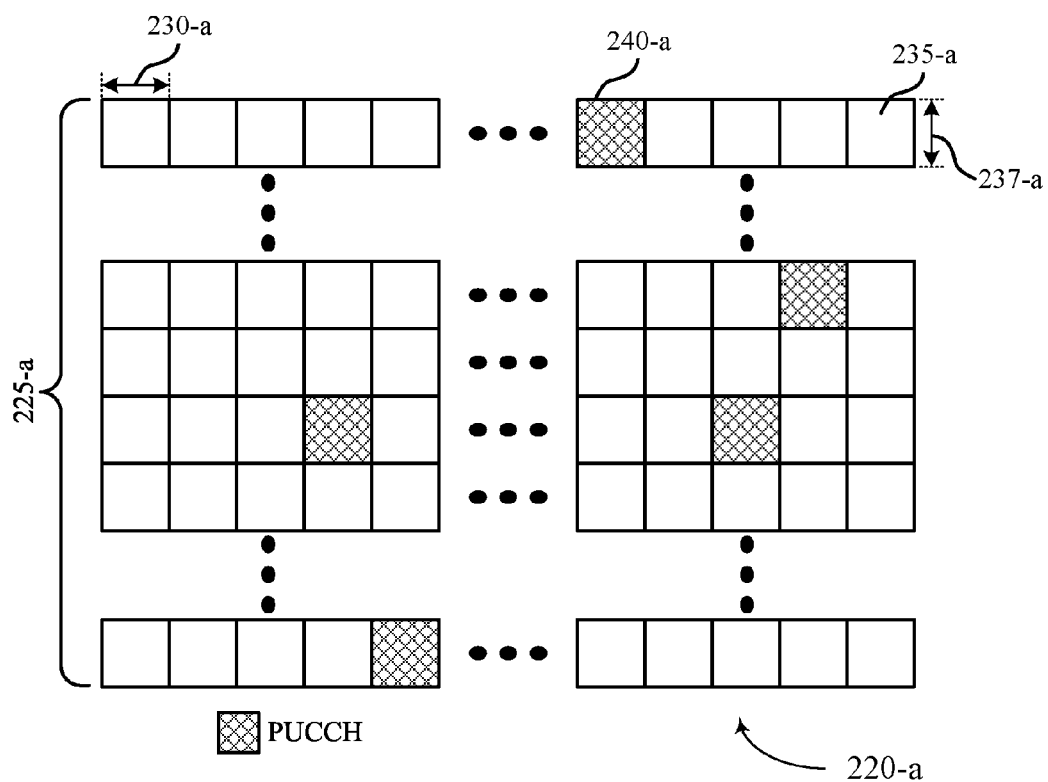
FIGS. 2B-2D illustrate examples of resource allocation associated with uplink control channel scheduling for jamming resilience in accordance with aspects of the present disclosure.
Figure 2C:
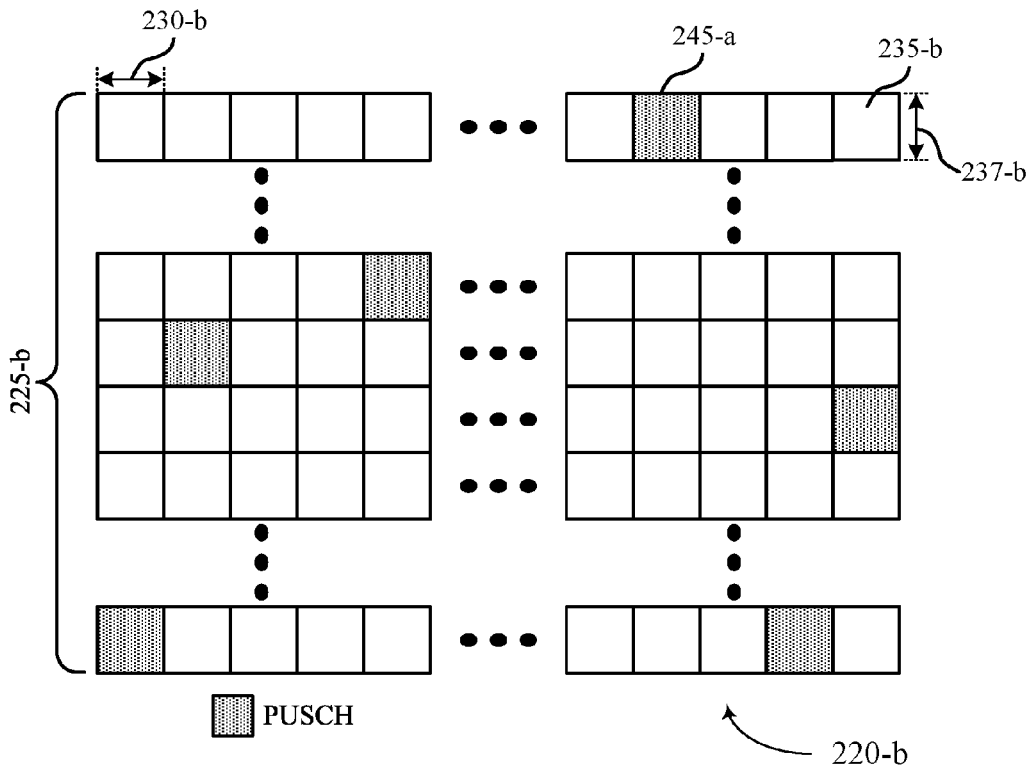
Figure 2D:
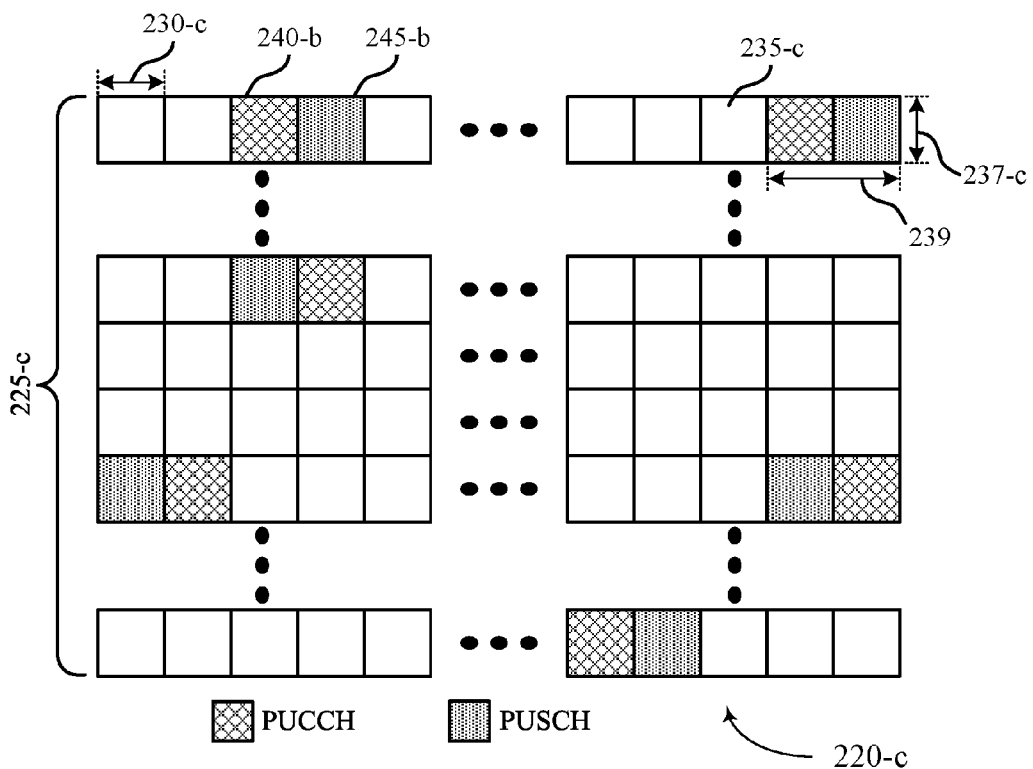

FIGS. 2B-2D illustrate examples of resource allocation associated with uplink control information scheduling for jamming resilience in accordance with various aspects of the present disclosure. As shown in FIG. 2B, system resources 220-*a* includes a system bandwidth 225-*a* (e.g., one or more carriers spanning a frequency bandwidth) and one or more time slots 230-*a*. The system resources 220-*a* may be segmented into resource blocks 235-*a*, each of which spans a given time slot 230-*a* and carrier 237-*a*. Though not shown, the time slots 230-*a* may be further segmented into one or more symbol periods (e.g., 7 symbols in an OFDM system) and the carriers 237-*a* may be segmented into one or more subcarriers (e.g., 12 subcarriers in an OFDM system).

In this example, a portion of the system resources 220-*a* are allocated for uplink control information. In particular, one or more resource blocks 240-*a* of the system resources 220-*a* are allocated for a physical uplink control channel (PUCCH). The PUCCH resource blocks 240-*a* may be allocated for one or more UEs 115-*a* of the wireless communications system 200. Using the PUCCH resource blocks 240-*a*, a UE 115-*a* may transmit uplink control information (e.g., CSI, SR, NACK, ACK, etc.) to the base station 105-*a*. In some examples, the PUCCH resource blocks 240-*a* represents the shared pattern of resources allocated for uplink control information for a UE 115-*a*. This shared pattern of resources may be randomly generated, selected, or configured by a base station 105-*a* or other nodes of the core network (e.g., core network 130 in FIG. 1).

In some examples, the PUCCH resource blocks 240-*a* may represent a hopping sequence, which may be identified by the UE 115-*a* when decoding the encoded message transmitted by the base station 105-*a*. The hopping sequence may also be associated with a periodicity, which may indicate how often and over which time intervals the hopping sequence repeats or may be associated with a time interval indicating how long the hopping sequence may be used. The hopping sequence, periodicity, and/or time interval may also be transmitted from the base station 105-*a* to the UE 115-*a* in an encoded message.

According to some aspects, the resources allocated for uplink control information, such as PUCCH resource blocks 240-*a*, may vary over time. For example, base station 105-*a*, or another node of the core network (e.g., core network 130 in FIG. 1), may change, update, modify, or otherwise determine resources allocated for uplink control information for the UE 115-*a* over time. Further, the hopping sequence as well as the periodicity and/or the time interval may vary over time. For example, the base station 105-*a* may change, update, modify, or otherwise determine the hopping sequence as well as the periodicity and/or the time interval over time. Such a change may be transmitted from the base station 105-*a* to the UE 115-*a* (e.g., in an encoded message over a secure RRC channel or in an encrypted PDCCH).

As shown in FIG. 2C, system resources 220-*b* includes a system bandwidth 225-*b* (e.g., one or more carriers spanning a frequency bandwidth) and one or more time slots 230-*b*. The system resources 220-*b* may be segmented into resource blocks 235-*b*, each of which spans a given time slot 230-*b* and carrier 237-*b*. Though not shown, a time slot 230-*b* may be further segmented into one or more symbol periods (e.g., 7 symbols in an OFDM system) and a carrier 237-*b* may be segmented into one or more subcarriers (e.g., 12 subcarriers in an OFDM system).

As shown, a portion of the system resources 220-*b* may be allocated for uplink control information to be transmitted using a physical uplink shared channel (PUSCH). The PUSCH resource blocks 245-*a* may be allocated for one or more UEs 115-*a* of the wireless communications system 200. Using the PUSCH resource blocks 245-*a*, a UE 115-*a* may transmit uplink control information (e.g., CSI, SR, NACK, ACK, etc.) to the base station 105-*a*. In some examples, the PUSCH resource blocks 245-*a* represents the shared pattern of resources allocated for uplink control information for a UEs 115. This shared pattern of resources may be randomly generated, selected, or configured by a base station 105-*a* or other nodes of the core network (e.g., core network 130 in FIG. 1).

In this example, the PUSCH resource blocks 245-*a* may also be used for uplink data transmission. In particular, using the resources allocated for PUSCH, a UE 115-*a* may transmit one or more data packets to the base station 105-*a* and may also use the PUSCH resource blocks 245-*a* for transmission of uplink control information, as discussed above In some examples, the PUSCH resource blocks 245-*a* may represent a hopping sequence, which may be identified by the UE 115-*a* when decoding the encoded message transmitted by the base station 105-*a*. The hopping sequence may also be associated with a periodicity, which may indicate how often and over which time intervals the hopping sequence repeats or may be associated with a time interval indicating how long the hopping sequence may be used. The hopping sequence, periodicity, and/or time interval may also be transmitted from the base station 105-*a* to the UE 115-*a* in an encoded message.

According to some aspects, the resources allocated for uplink transmission, such as PUSCH resource blocks 245-*a*, may vary over time. For example, base station 105-*a*, or another node of the core network (e.g., core network 130 in FIG. 1), may change, update, modify, or otherwise determine resources allocated for uplink control information for the UE 115-*a* over time. Further, the hopping sequence as well as the periodicity and/or the time interval may vary over time. For example, the base station 105-*a* may change, update, modify, or otherwise determine the hopping sequence as well as the periodicity and/or the time interval over time. Such a change may be transmitted from the base station 105-*a* to the UE 115-*a* (e.g., in an encoded message over a secure RRC channel or in an encrypted PDCCH).

As shown in FIG. 2D, system resources 220-*c* includes a system bandwidth 225-*c* (e.g., one or more carriers spanning a frequency bandwidth) and one or more time slots 230-*c*. The system resources 220-*c* may be segmented into resource blocks 235-*c*, each of which spans a given time slot 230-*c* and carrier 237-*c*. Though not shown, a time slot 230-*c* may be further segmented into one or more symbol periods (e.g., 7 symbols in an OFDM system) and the a carrier 237-*c* may be segmented into one or more subcarriers (e.g., 12 subcarriers in an OFDM system). Further, a subframe 239 may include two time slots 230-*c*, as shown.

In this example, a portion of the system resources 220-*c* are allocated for uplink control information. In particular, one or more resource blocks 240-*b* of the system resources 220-*c* are allocated for a PUCCH. The PUCCH resource blocks 240-*b* may be allocated for one or more UEs 115-*a* of the wireless communications system 200. Using the PUCCH resource blocks 240-*b*, a UE 115-*a* may transmit uplink control information (e.g., CSI, SR, NACK, ACK, etc.) to the base station 105-*a*.

Also as shown, a portion of the system resources 220-*c* may be allocated for a PUSCH. The PUSCH resource blocks 245-*b* may be allocated for one or more UEs 115-*a* of the wireless communications system 200. Using the PUSCH resource blocks 245-*b*, a UE 115-*a* may transmit uplink data to the base station 105-*a*. In particular, using the resources allocated for PUSCH, a UE 115-*a* may transmit one or more data packets to the base station 105-*a*. In this example, the PUCCH resource blocks 240-*b* and the PUSCH resource blocks 245-*b* are scheduled in consecutive resource blocks 235-*c*, which collectively span at least a portion of a subframe 239. In some cases, the pair of resource blocks 235-*c* that includes a PUCCH resource block 240-*b* and a PUSCH resource block 245-*b* may be resources allocated for a single UE 115-*a*. In other cases, the pair of resource blocks 235-*c* that includes a PUCCH resource block 240-*b* and a PUSCH resource block 245-*b* may be resources allocated for different or multiple UEs 115-*a*.

In some examples, the PUCCH resource blocks 240-*b* and the PUSCH resource blocks 245-*b* represent the shared pattern of resources allocated for uplink transmission for a UE 115-*a*. This shared pattern of resources may be randomly generated, selected, or configured by a base station 105-*a* or other nodes of the core network (e.g., core network 130 in FIG. 1).

In some examples, the PUCCH resource blocks 240-*b* and PUSCH resource blocks 245-*b* may represent a hopping sequence, which may be identified by the UE 115-*a* when decoding the encoded message transmitted by the base station 105-*a*. The hopping sequence may also be associated with a periodicity, which may indicate how often and over which time intervals the hopping sequence repeats or may be associated with a time interval indicating how long the hopping sequence may be used. The hopping sequence, periodicity, and/or time interval may also be transmitted from the base station 105-*a* to the UE 115-*a* in an encoded message.

According to some aspects, the resources allocated for uplink transmission, such as PUCCH resource blocks 240-*b* and PUSCH resource blocks 245-*b*, may vary over time. For example, base station 105-*a*, or another node of the core network (e.g., core network 130 in FIG. 1), may change, update, modify, or otherwise determine resources allocated for uplink control information for the UE 115-*a* over time. Further, the hopping sequence as well as the periodicity and/or the time interval may vary over time. For example, the base station 105-*a* may change, update, modify, or otherwise determine the hopping sequence as well as the periodicity and/or the time interval over time. Such a change may be transmitted from the base station 105-*a* to the UE 115-*a* (e.g., in an encoded message over a secure RRC channel or in an encrypted PDCCH).

Figure 3:
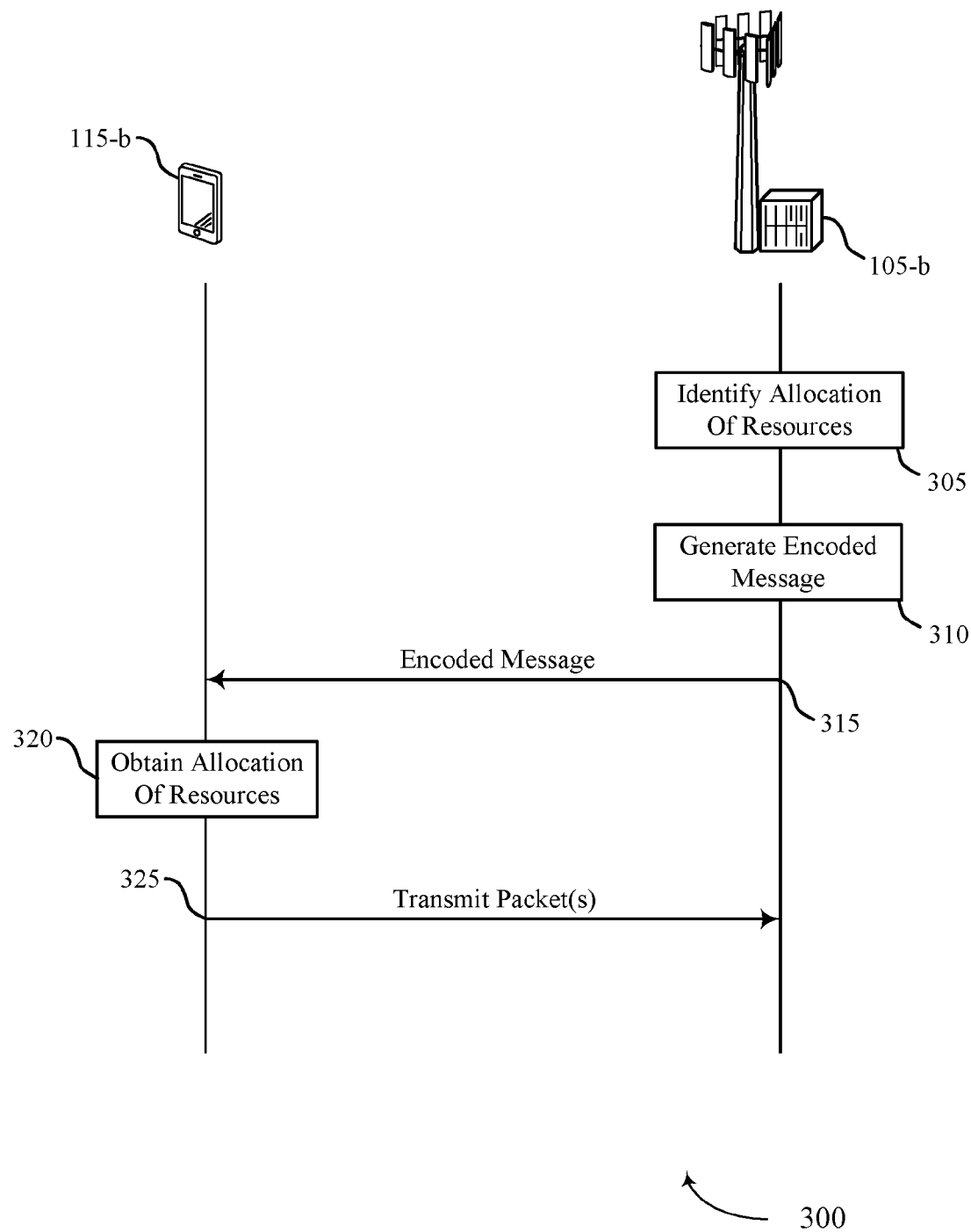
FIG. 3 illustrates an example of a process flow that supports uplink control channel scheduling for jamming resilience in accordance with aspects of the present disclosure.

FIG. 3 illustrates an example of a process flow 300 for uplink control channel scheduling for jamming resilience in accordance with various aspects of the present disclosure. In some cases, process flow 300 may represent aspects of techniques performed by a UE 115 or base station 105 as described with reference to FIGS. 1-2.

As shown at 305, base station 105-*b* may identify an allocation of resources. The allocation of resources may include a shared pattern of resources allocated for uplink control information for UE 115-*b*. In some examples, the entirety of the shared pattern of resources may be allocated to UE 115-*b*. In other examples, the allocation of the shared pattern of resources may be to two or more UEs. The allocation of resources may be time varying and may include a hopping sequence, a periodicity, or a time period. The hopping sequence may identify the one or more resource blocks allocated for uplink control or data information for the UE 115-*b* and/or other UEs. The periodicity may indicate how often or over what time intervals the hopping sequence repeats. The time period may how long the resources will be allocated to the UE 115-*b*. In some examples, the base station 105-*b* may identify one or more time varying allocations of resources for one or more UEs that includes a shared pattern of resources allocated for uplink control information. In some examples, the base station 105-*b* may scramble a first time varying allocation of resources of the one or more time varying allocations of resources using an identifier of a particular UE to make the first time varying allocation of resources specific to the particular UE. In some examples, the base station 105-*b* may encrypt a first time varying allocation of resources of the one or more time varying allocations of resources using an encryption key of a particular UE to make the first time varying allocation of resources specific to the particular UE. The base station 105-*a* may also scramble and/or encrypt each of the time varying allocations of resources to make each time varying allocations of resources specific to individual UEs.

At 310, the base station 105-*b* generates an encoded message. The encoded message may include the allocation of resources identified in 305. In some examples, the encoded message may include one or more time varying allocations of resources for one or more UEs. The encoded message may be based on or scrambled using a UE 115-*b* identifier (e.g., a C-RNTI), and/or an identifier of each UE being allocated resources in 305.

At 315, the base station 105-*a* transmits the encoded message to the UE 115-*b*. In some examples, the encoded message may be transmitted using a secure radio channel (e.g., a secure RRC channel).

At 320, the UE 115-*b* may receive the encoded message transmitted by the base station 105-*b* at 315. The UE 115-*b* may then decode the encoded message to obtain its resource allocation identified by the base station in 305. In some examples, the UE 115-*b* may descramble the encoded message using its UE identifier and/or decode using an encryption key. In an example, the UE 115-*b* may derive the encryption key based at least in part on a key shared with the base station 105-*a*. If able to properly descramble using its UE identifier and/or decode using the encryption key, the UE 115-*b* may determine that the encoded message includes a time varying allocation of resources for the UE 115-*b*. Use of an identifier of UE 115-*b* or an encryption key of UE 115-*b* may indicate that the time varying allocation of resources is specific to UE 115-*b* and may, for example, permit UE 115-*b* to identify its time varying allocation of resources within an encoded message including multiple time varying allocations of resources for multiple UEs.

Once obtained, at 325 the UE 115-*b* may transmit uplink control information to the base station 105-*b* based at least in part on the allocation of resource obtained at 320. The uplink control information may include a SR, ACK, NACK, or CSI, among others. In some examples, the UE 115-*b* may transmit uplink data to the base station 105-*b* at 325 (e.g., if the obtained resources also identified resources allocated for a PUSCH).

Figure 4:
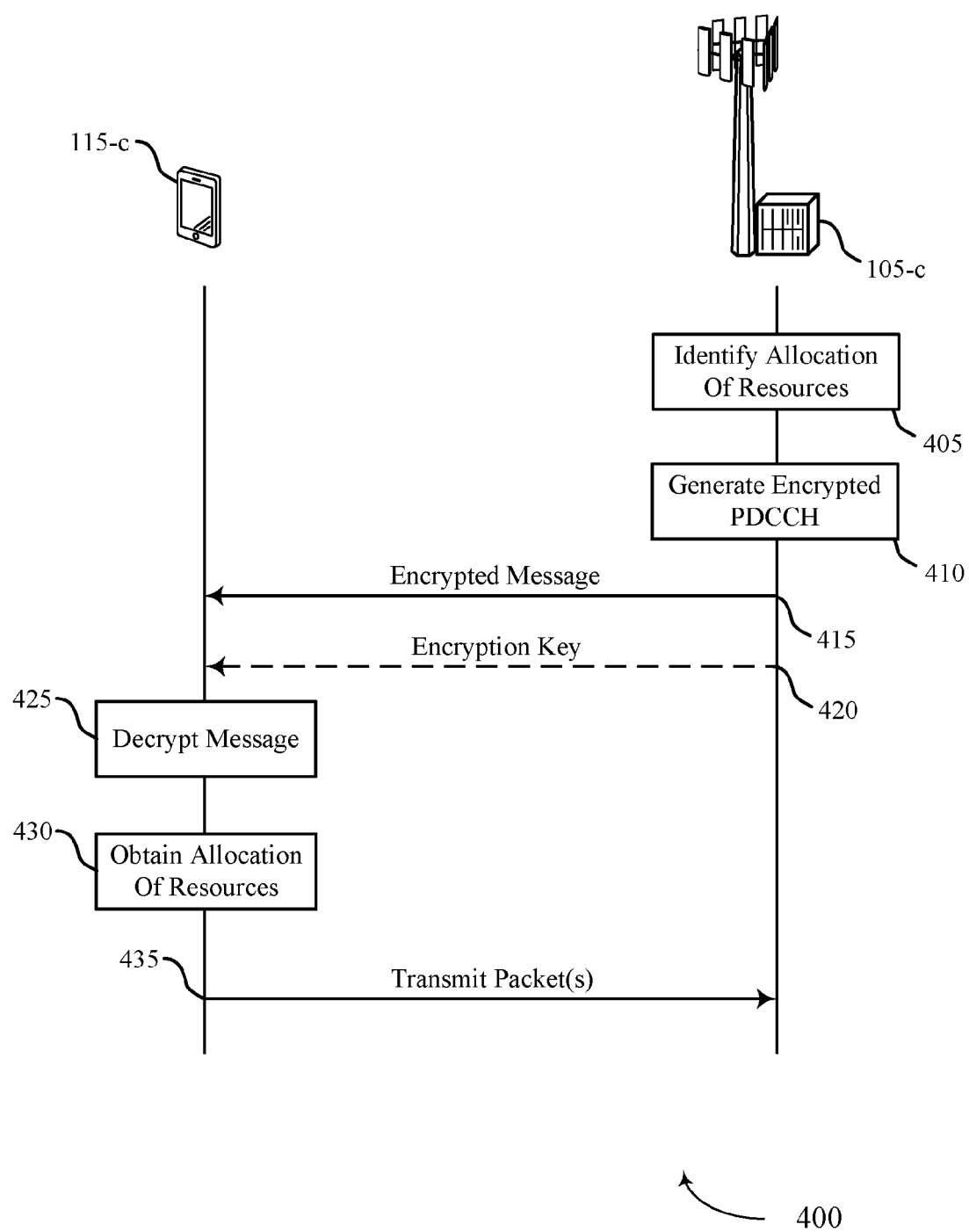
FIG. 4 illustrates an example of a process flow in a system that supports uplink control channel scheduling for jamming resilience in accordance with aspects of the present disclosure.

FIG. 4 illustrates an example of a process flow 400 for uplink control channel scheduling for jamming resilience in accordance with various aspects of the present disclosure. Process flow 400 may include base station 105-*c* and UE 115-*c*, which may be examples of the corresponding devices described with reference to FIGS. 1-2.

As shown at 405, base station 105-*c* may identify an allocation of resources. The allocation of resources may include a shared pattern of resources allocated for uplink control information for UE 115-*c*. The allocation of resources may be time varying and may include a hopping sequence, a periodicity, or a time period. The hopping sequence may identify the one or more resource blocks allocated for uplink control or data information for the UE 115-*c*. The periodicity may indicate how often or over what time intervals the hopping sequence repeats. The time period may be how long the resources will be allocated to the UE 115-*c*. In some examples, the base station 105-*b* may identify one or more time varying allocations of resources for one or more UEs that includes a shared pattern of resources allocated for uplink control information. The base station 105-*a* may also scramble and/or encrypt one or more of the time varying allocations of resources to make the one or more time varying allocations of resources specific to individual UEs.

At 410, the base station 105-*c* generates an encrypted PDCCH. The encrypted PDCCH may include a PDCCH message encrypted using an encryption key. In some examples, the PDCCH message is encrypted using an encryption key derivable based on a shared key associated with the base station 105-*c* and the UE 115-*c*, such as a KeNB or may be encrypted using an encryption key common to all UEs 115-*c* connected to or attempting to connect to the base station 105-*c*. In some examples, the encrypted PDCCH may be integrity protected using a MAC, CRC, or by replacing a CRC checksum with a MAC. According to various implementations, the MAC may be computed based on a PDCCH integrity protection key.

The encrypted PDCCH may include the allocation of resources identified in 405. In some cases, the encrypted PDCCH may include an encoded message that includes the allocation of resources identified in 405. The encrypted message may be based on or scrambled using a UE 115-*c* identifier (e.g., a C-RNTI) and/or an identifier of each UE being allocated resources in 405.

At 415, the base station 105-*c* transmits the encrypted PDCCH to the UE 115-*c*. In some examples, the encrypted PDCCH may be transmitted using a secure radio channel (e.g., a secure RRC channel).

Optionally, at 420, the base station 105-*c* may transit the encryption key to the UE 115-*c*. In some examples, the encryption key may be transmitted using a secure radio channel (e.g., a secure RRC channel).

At 425, the UE 115-*c* may receive the encrypted PDCCH and optionally the encryption key transmitted by the base station 105-*c* at 415 and 420 respectively. The UE 115-*c* may then decrypt the encrypted PDCCH using the encryption key transmitted at 420 or by using an encryption key derived by the UE 115-*c*. The UE 115-*c* may also descramble using its UE identifier. Use of an identifier of UE 115-*c* or an encryption key of UE 115-*c* may indicate that the time varying allocation of resources is specific to UE 115-*c* and may, for example, permit UE 115-*c* to identify its time varying allocation of resources within an encoded message including multiple time varying allocations of resources for multiple UEs.

Once the PDCCH message is decrypted, the UE 115-*c* may obtain the resource allocation identified by the base station in 405 and may then transmit uplink control information to the base station 105-*c* at 435 based on the allocation of resource obtained at 430. The uplink control information may include a SR, ACK, NACK, or CSI, among others. In some examples, the UE 115-*c* may transmit uplink data to the base station 105-*c* at 435 (e.g., if the obtained resources also identified resources allocated for a PUSCH).

Advantageously, the examples described herein may change uplink control resources (e.g., PUCCH resources) for devices over time to increase security and securely indicate the time-varying uplink control resources to avoid or prevent a jamming device from jamming uplink communication by a UE.

Figure 5:
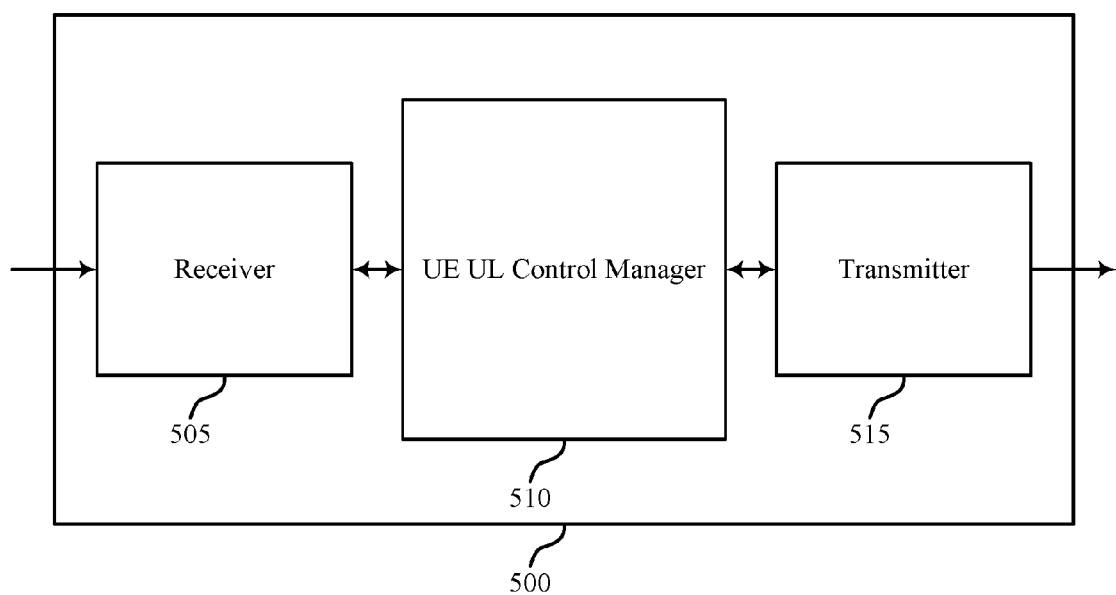
FIGS. 5 through 7 show block diagrams of a wireless device that supports uplink control channel scheduling for jamming resilience in accordance with aspects of the present disclosure.

FIG. 5 shows a block diagram of a wireless device 500 that supports uplink control channel scheduling for jamming resilience in accordance with various aspects of the present disclosure. Wireless device 500 may be an example of aspects of a UE 115 described with reference to FIGS. 1 through 4. Wireless device 500 may include receiver 505, UE uplink control manager 510 and transmitter 515. Wireless device 500 may also include a processor. Each of these components may be in communication with each other.

The receiver 505 may receive information such as packets, user data, or control information associated with various information channels (e.g., control channels, data channels, and information related to uplink control channel scheduling for jamming resilience, etc.). Information may be passed on to other components of the device. The receiver 505 may be an example of aspects of the transceiver 825 described with reference to FIG. 8.

The UE uplink control manager 510 may receive an encoded message from a base station, obtain, from the encoded message, a time varying allocation of resources including a shared pattern of resources allocated for uplink control information, and transmit uplink control information based at least in part on the shared pattern of resources. The UE uplink control manager 510 may also be an example of aspects of the UE uplink control manager 805 described with reference to FIG. 8.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or it may include a plurality of antennas.

Figure 6:
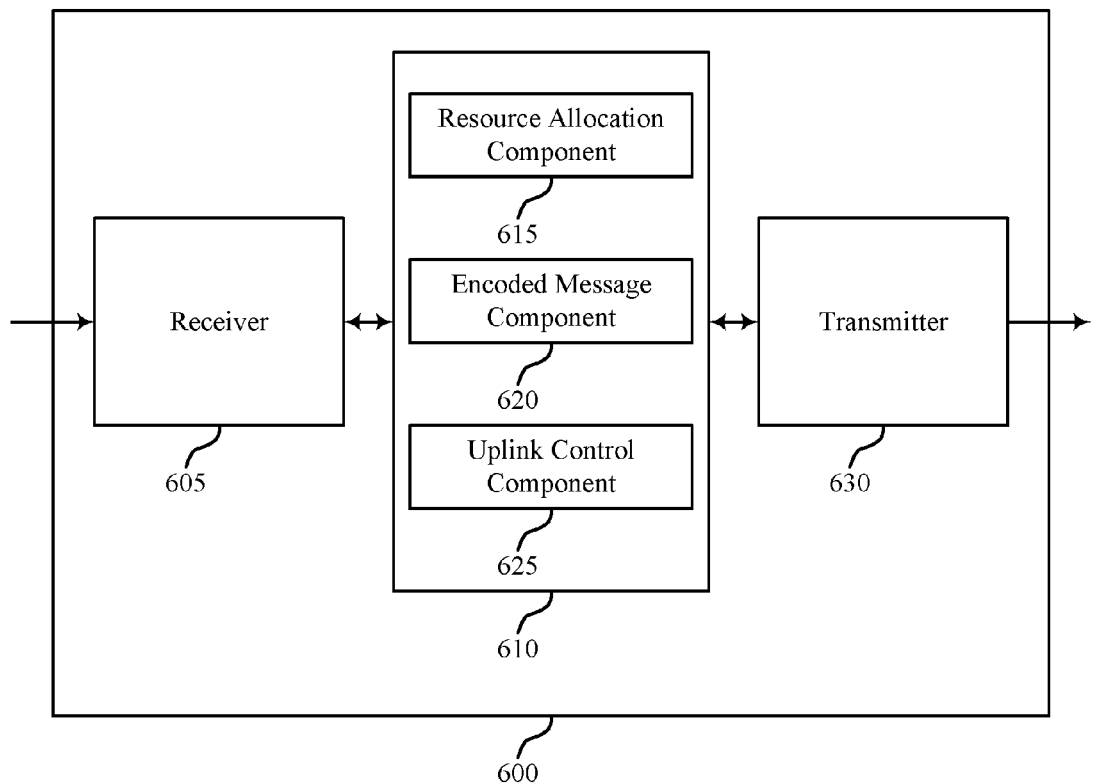

FIG. 6 shows a block diagram of a wireless device 600 that supports uplink control channel scheduling for jamming resilience in accordance with various aspects of the present disclosure. Wireless device 600 may be an example of aspects of a wireless device 500 or a UE 115 described with reference to FIGS. 1 through 5. Wireless device 600 may include receiver 605, UE uplink control manager 610 and transmitter 630. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The UE uplink control manager 610 may be an example of aspects of UE uplink control manager 510 described with reference to FIG. 5. The UE uplink control manager 610 may include resource allocation component 615, encoded message component 620 and uplink control component 625. The UE uplink control manager 610 may be an example of aspects of the UE uplink control manager 805 described with reference to FIG. 8.

The resource allocation component 615 may obtain, from the encoded message, a time varying allocation of resources including a shared pattern of resources allocated for uplink control information. In some cases, the time varying allocation of resources for uplink control information includes resource allocation for at least one of a PUCCH, or a PUSCH, or a combination thereof associated with the wireless device 600.

The encoded message component 620 may receive an encoded message from a base station, and obtain, from the encoded message, at least one of a hopping sequence, or a periodicity, or a time period, or a combination thereof associated with the time varying allocation of resources. In some cases, receiving the encoded message from the base station includes receiving an encrypted PDCCH message including the time varying allocation of resources.

The uplink control component 625 may transmit uplink control information based at least in part on the shared pattern of resources. In some cases, the uplink control information includes at least one of an SR, or an ACK message, or a NACK message, or a CSI, or a combination thereof. In some cases, the CSI includes at least one of a CQI, or a PMI, or a precoding type indicator, or a rank indication, or a combination thereof. In some cases, the ACK message includes a HARQ ACK message and where the NACK message includes a HARQ NACK message.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8. The transmitter 630 may utilize a single antenna, or it may utilize a plurality of antennas.

Figure 7:
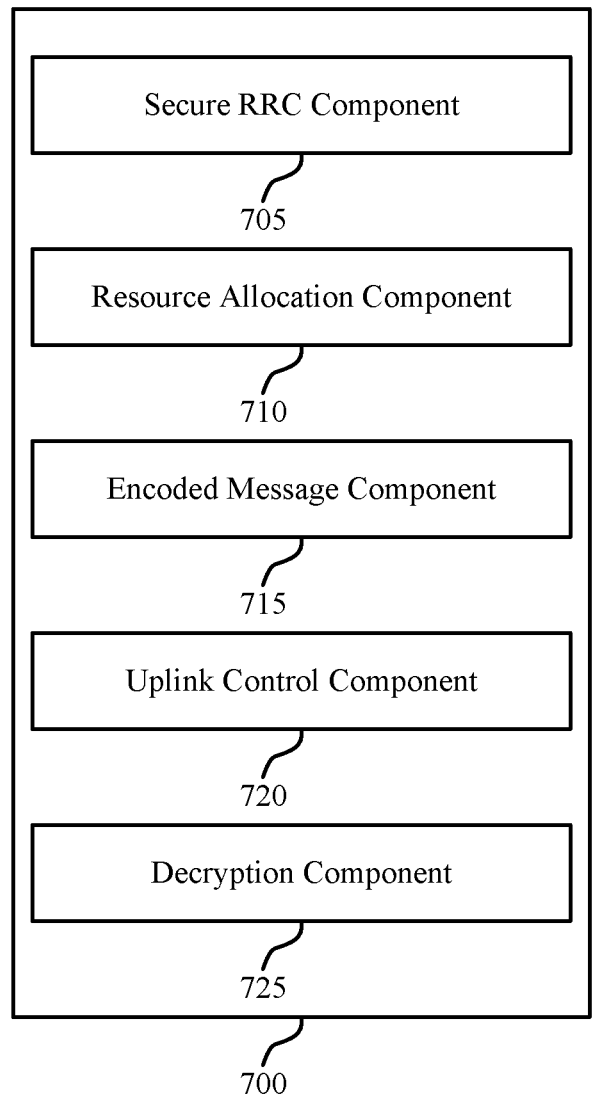

FIG. 7 shows a block diagram of a UE uplink control manager 700 which may be an example of the corresponding component of wireless device 500 or wireless device 600. That is, UE uplink control manager 700 may be an example of aspects of UE uplink control manager 510 or UE uplink control manager 610 described with reference to FIGS. 5 and 6. The UE uplink control manager 700 may also be an example of aspects of the UE uplink control manager 805 described with reference to FIG. 8.

The UE uplink control manager 700 may include secure RRC component 705, resource allocation component 710, encoded message component 715, uplink control component 720 and decryption component 725. Each of these modules may communicate, directly or indirectly, with one another (e.g., via one or more buses).

The secure RRC component 705 may establish a secure RRC channel with the base station, where receiving the encoded message includes receiving the encoded message using the secure RRC channel. The resource allocation component 710 may obtain, from the encoded message, a time varying allocation of resources including a shared pattern of resources allocated for uplink control information.

The encoded message component 715 may receive an encoded message from a base station, and obtain, from the encoded message, at least one of a hopping sequence, or a periodicity, or a time period, or a combination thereof associated with the time varying allocation of resources. The uplink control component 720 may transmit uplink control information based at least in part on the shared pattern of resources. In some cases, the uplink control information includes at least one of an SR, or an ACK message, or a NACK message, or a CSI, or a combination thereof.

The decryption component 725 may decrypt the encrypted PDCCH message using an encryption key. In some cases, the encryption key is obtained from the base station using a secure RRC message. In some cases, the encryption key is derived by the client device based on a key shared with the base station.

Figure 8:
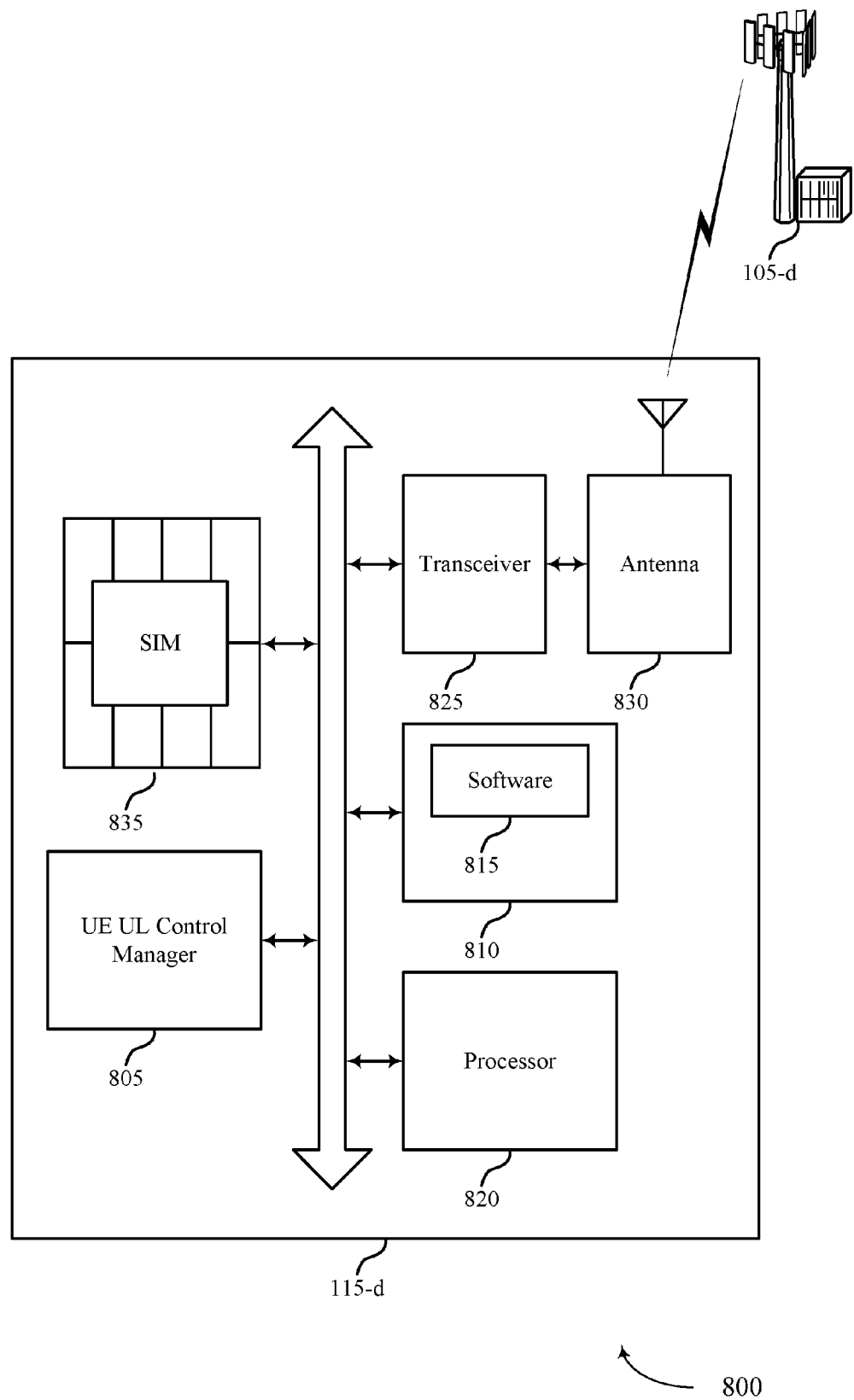
FIG. 8 illustrates a block diagram of a system including a UE that supports uplink control channel scheduling for jamming resilience in accordance with aspects of the present disclosure.

FIG. 8 shows a diagram of a system 800 including a device that supports uplink control channel scheduling for jamming resilience in accordance with various aspects of the present disclosure. For example, system 800 may include UE 115-*d*, which may be an example of a wireless device 500, a wireless device 600, or a UE 115 as described with reference to FIGS. 1 through 7.

UE 115-*d* may also include UE uplink control manager 805, memory 810, processor 820, transceiver 825, antenna 830 and SIM 835. Each of these modules may communicate, directly or indirectly, with one another (e.g., via one or more buses). The UE uplink control manager 805 may be an example of a UE uplink control manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., uplink control channel scheduling for jamming resilience, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

SIM 835 may be an IC that securely stores the IMSI and the related key used to identify and authenticate UE 115-*i*. SIM 835 may also contain a unique serial number (e.g., an ICCID), security authentication and ciphering information, temporary information related to the local network, a list of the services, a PIN, and a PUK for PIN unlocking. In some cases, SIM 835 may be a circuit embedded in a removable card.

Figure 9:
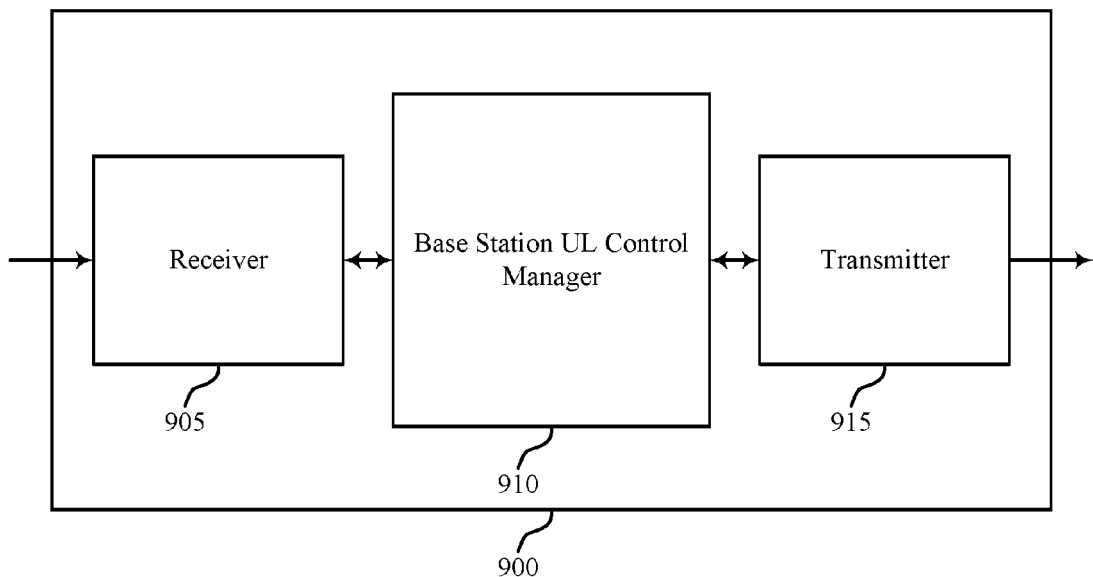
FIGS. 9 through 11 show block diagrams of a wireless device that supports uplink control channel scheduling for jamming resilience in accordance with aspects of the present disclosure.

FIG. 9 shows a block diagram of a wireless device 900 that supports uplink control channel scheduling for jamming resilience in accordance with various aspects of the present disclosure. Wireless device 900 may be an example of aspects of a base station 105 described with reference to FIGS. 1 through 5. Wireless device 900 may include receiver 905, base station uplink control manager 910 and transmitter 915. Wireless device 900 may also include a processor. Each of these components may be in communication with each other.

The receiver 905 may receive information such as packets, user data, or control information associated with various information channels (e.g., control channels, data channels, and information related to uplink control channel scheduling for jamming resilience, etc.). Information may be passed on to other components of the device. The receiver 905 may be an example of aspects of the transceiver 1225 described with reference to FIG. 12.

The base station uplink control manager 910 may identify a time varying allocation of resources including a shared pattern of resources allocated for uplink control information of a client device, generate an encoded message including the identified time varying allocation of resources, and transmit the encoded message to the client device. The base station uplink control manager 910 may also be an example of aspects of the base station uplink control manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
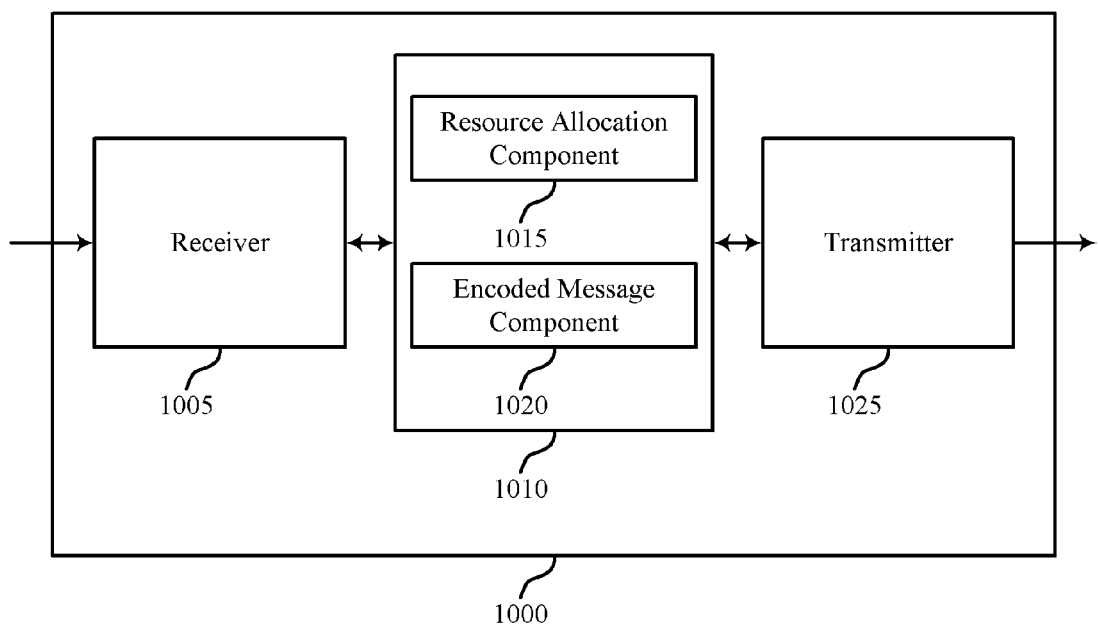

FIG. 10 shows a block diagram of a wireless device 1000 that supports uplink control channel scheduling for jamming resilience in accordance with various aspects of the present disclosure. Wireless device 1000 may be an example of aspects of a wireless device 900 or a base station 105 described with reference to FIGS. 1 through 5 and 9. Wireless device 1000 may include receiver 1005, base station uplink control manager 1010 and transmitter 1025. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The base station uplink control manager 1010 may be an example of aspects of base station uplink control manager 910 described with reference to FIG. 9. The base station uplink control manager 1010 may include resource allocation component 1015 and encoded message component 1020. The base station uplink control manager 1010 may be an example of aspects of the base station uplink control manager 1205 described with reference to FIG. 12.

The resource allocation component 1015 may identify a time varying allocation of resources including a shared pattern of resources allocated for uplink control information of a client device. In some cases, the time varying allocation of resources includes one or more RBs allocated for transmission of uplink control information for the client device. In some cases, the one or more RBs allocated for transmission of uplink control information are randomly selected by the base station. In some cases, the time varying allocation of resources includes resource allocation for at least one of a PUCCH, or a PUSCH, or a combination thereof associated with the client device.

The encoded message component 1020 may generate an encoded message including the identified time varying allocation of resources, transmit the encoded message to the client device, and transmit, to the client device, an encrypted PDCCH message including the identified time varying allocation of resources.

The transmitter 1025 may transmit signals received from other components of wireless device 1000. In some examples, the transmitter 1025 may be collocated with a receiver in a transceiver module. For example, the transmitter 1025 may be an example of aspects of the transceiver 1225 described with reference to FIG. 12. The transmitter 1025 may utilize a single antenna, or it may utilize a plurality of antennas.

Figure 11:
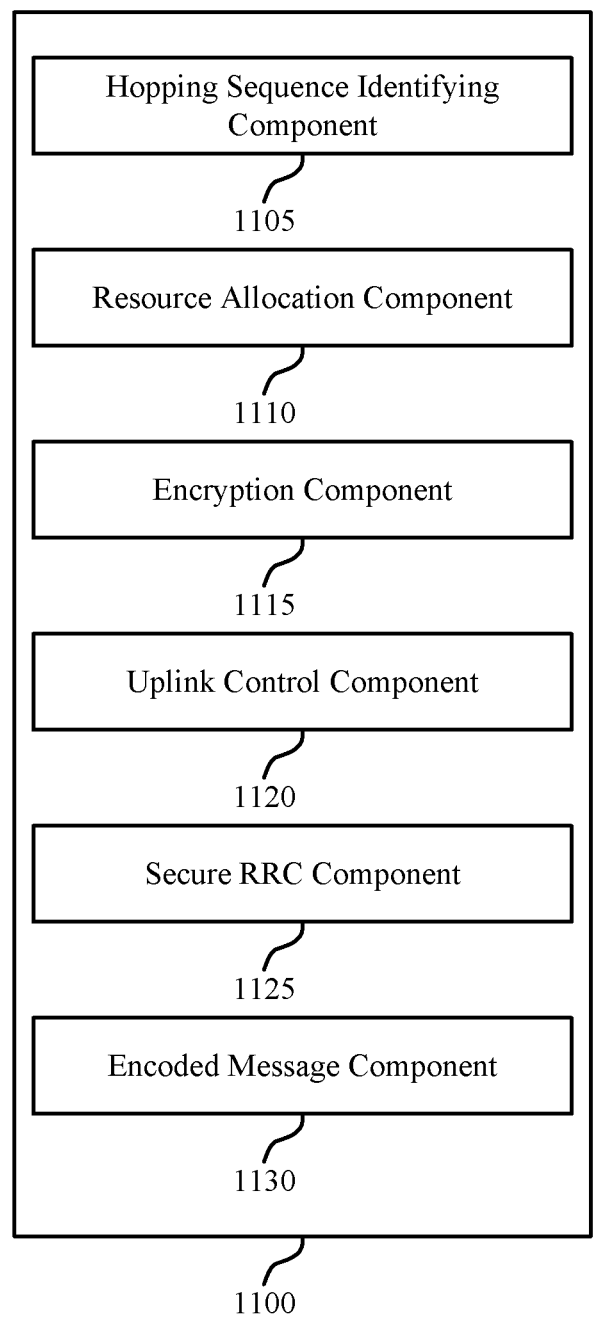

FIG. 11 shows a block diagram of a base station uplink control manager 1100 which may be an example of the corresponding component of wireless device 900 or wireless device 1000. That is, base station uplink control manager 1100 may be an example of aspects of base station uplink control manager 910 or base station uplink control manager 1010 described with reference to FIGS. 9 and 10. The base station uplink control manager 1100 may also be an example of aspects of the base station uplink control manager 1205 described with reference to FIG. 12.

The base station uplink control manager 1100 may include hopping sequence identifying component 1105, resource allocation component 1110, encryption component 1115, uplink control component 1120, secure RRC component 1125 and encoded message component 1130. Each of these modules may communicate, directly or indirectly, with one another (e.g., via one or more buses).

The hopping sequence identifying component 1105 may identify at least one of a hopping sequence, or a periodicity, or a time period, or a combination thereof associated with the time varying allocation of resources, where the encoded message further includes at least one of the identified hopping sequence, or the identified periodicity, or the identified time period, or a combination thereof.

The resource allocation component 1110 may identify a time varying allocation of resources including a shared pattern of resources allocated for uplink control information of a client device.

The encryption component 1115 may transmit the encryption key to the client device using a secure RRC message. In some cases, generating the encrypted PDCCH message includes encrypting a PDCCH message using an encryption key. In some cases, the encryption key is based on a key shared with the client device.

The uplink control component 1120 may receive uplink control information from the client device based on the identified time varying allocation of resources, and CSI includes at least one of a CQI, or a PMI, or a precoding type indicator, or a rank indication, or a combination thereof. In some cases, the uplink control information includes at least one of an SR, or an ACK message, or a NACK message, or a CSI, or a combination thereof.

The secure RRC component 1125 may establish a secure RRC channel with the client device, where transmitting the encoded message includes transmitting the encoded message using the secure RRC channel.

The encoded message component 1130 may generate an encoded message including the identified time varying allocation of resources, transmit the encoded message to the client device, and transmit, to the client device, an encrypted PDCCH message including the identified time varying allocation of resources.

Figure 12:
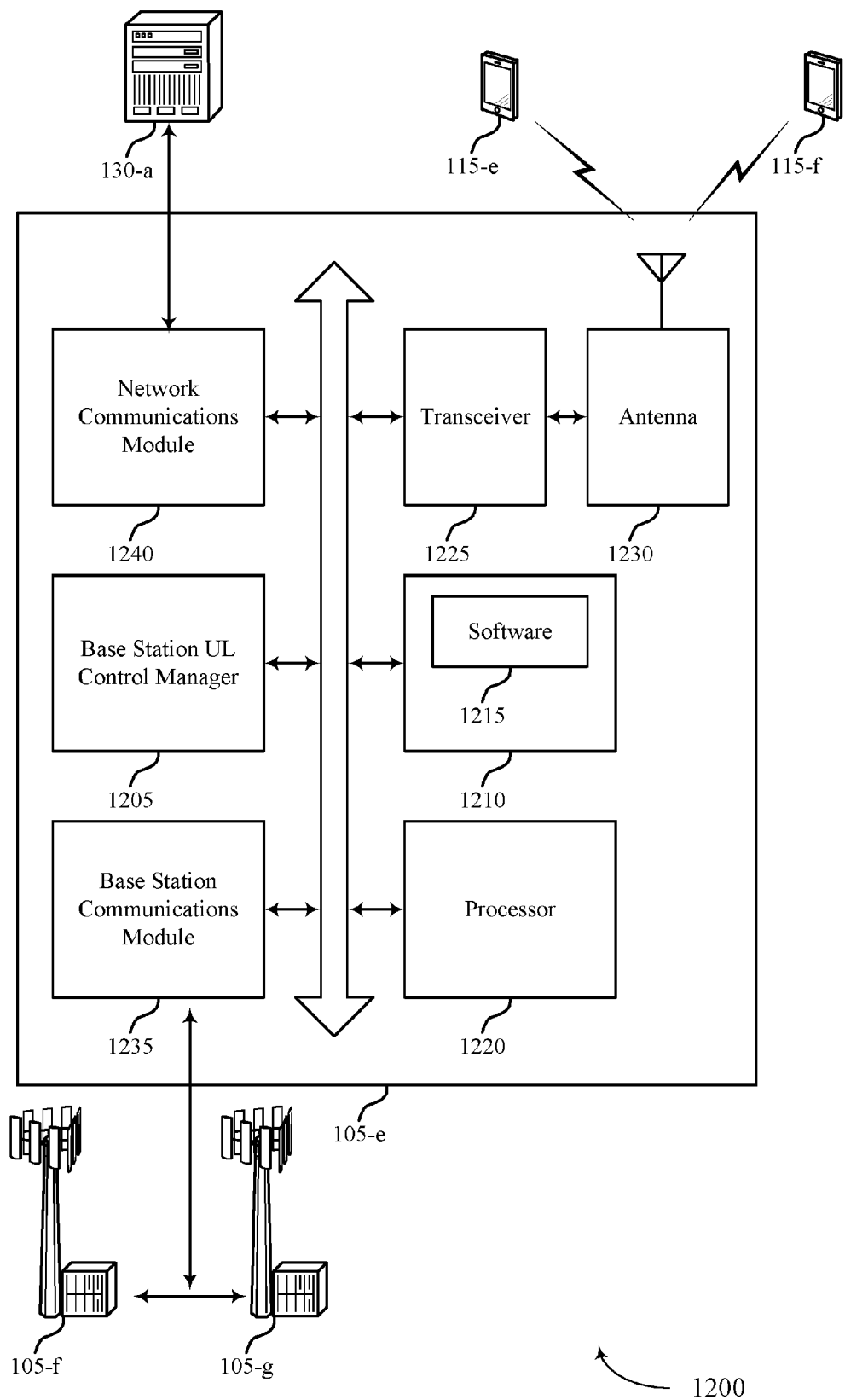
FIG. 12 illustrates a block diagram of a system including a base station that supports uplink control channel scheduling for jamming resilience in accordance with aspects of the present disclosure.

FIG. 12 shows a diagram of a wireless system 1200 including a device that supports uplink control channel scheduling for jamming resilience in accordance with various aspects of the present disclosure. For example, system 1200 may include base station 105-e, which may be an example of a wireless device 900, a wireless device 1000, or a base station 105 as described with reference to FIGS. 1 through 5 and 9 through 11. Base station 105-e may also include components for bi-directional voice and data communications including components for transmitting communications and components for receiving communications. For example, base station 105-e may communicate bi-directionally with one or more UEs 115.

Base station 105-e may also include base station uplink control manager 1205, memory 1210, processor 1220, transceiver 1225, antenna 1230, base station communications module 1235 and network communications module 1240. Each of these modules may communicate, directly or indirectly, with one another (e.g., via one or more buses). The base station uplink control manager 1205 may be an example of a base station uplink control manager as described with reference to FIGS. 9 through 11.

The memory 1210 may include RAM and ROM. The memory 1210 may store computer-readable, computer-executable software including instructions that, when executed, cause the processor to perform various functions described herein (e.g., uplink control channel scheduling for jamming resilience, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 830, which may be capable of concurrently transmitting or receiving multiple wireless transmissions.

The base station communications module 1235 may manage communications with other base station 105-f and 105-g, and may include a controller or scheduler for controlling communications with UEs 115 in cooperation with other base stations 105-f and 105-g. For example, the base station communications module 1235 may coordinate scheduling for transmissions to UEs 115 for various interference mitigation techniques such as beamforming or joint transmission. In some examples, base station communications module 1235 may provide an X2 interface within an LTE/LTE-A wireless communication network technology to provide communication between base stations 105.

The network communications module 1240 may manage communications with the core network (e.g., via one or more wired backhaul links). For example, the network communications module 1240 may manage the transfer of data communications for client devices, such as one or more UEs 115.

Figure 13:
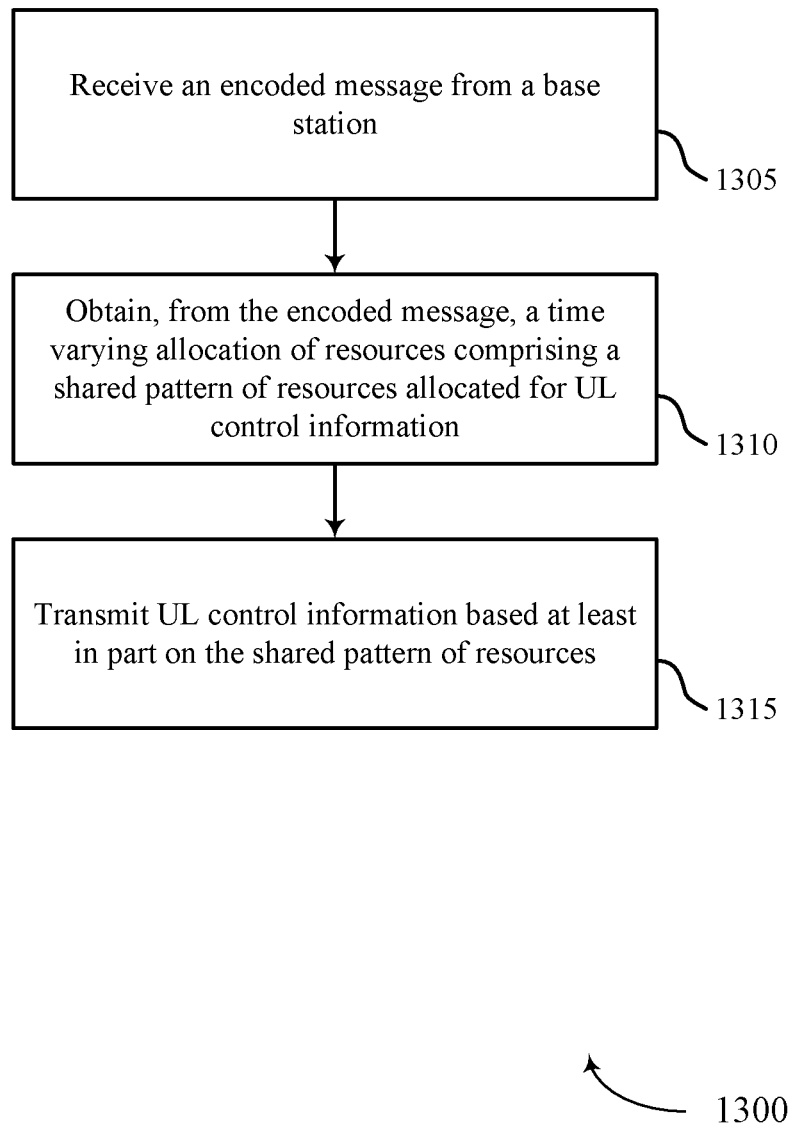
FIGS. 13 through 16 illustrate methods for uplink control channel scheduling for jamming resilience in accordance with aspects of the present disclosure.

FIG. 13 shows a flowchart illustrating a method 1300 for uplink control channel scheduling for jamming resilience in accordance with various aspects of the present disclosure. The operations of method 1300 may be implemented by a device such as a UE 115 or its components as described with reference to FIGS. 1 through 5. For example, the operations of method 1300 may be performed by the UE uplink control manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may receive an encoded message from a base station as described above with reference to FIGS. 2 through 5. In certain examples, the operations of block 1305 may be performed by the encoded message component as described with reference to FIGS. 6 and 7.

At block 1310, the UE 115 may obtain, from the encoded message, a time varying allocation of resources including a shared pattern of resources allocated for uplink control information as described above with reference to FIGS. 2 through 5. In certain examples, the operations of block 1310 may be performed by the resource allocation component as described with reference to FIGS. 6 and 7.

At block 1315, the UE 115 may transmit uplink control information based at least in part on the shared pattern of resources as described above with reference to FIGS. 2 through 5. In certain examples, the operations of block 1315 may be performed by the uplink control component as described with reference to FIGS. 6 and 7.

Figure 14:
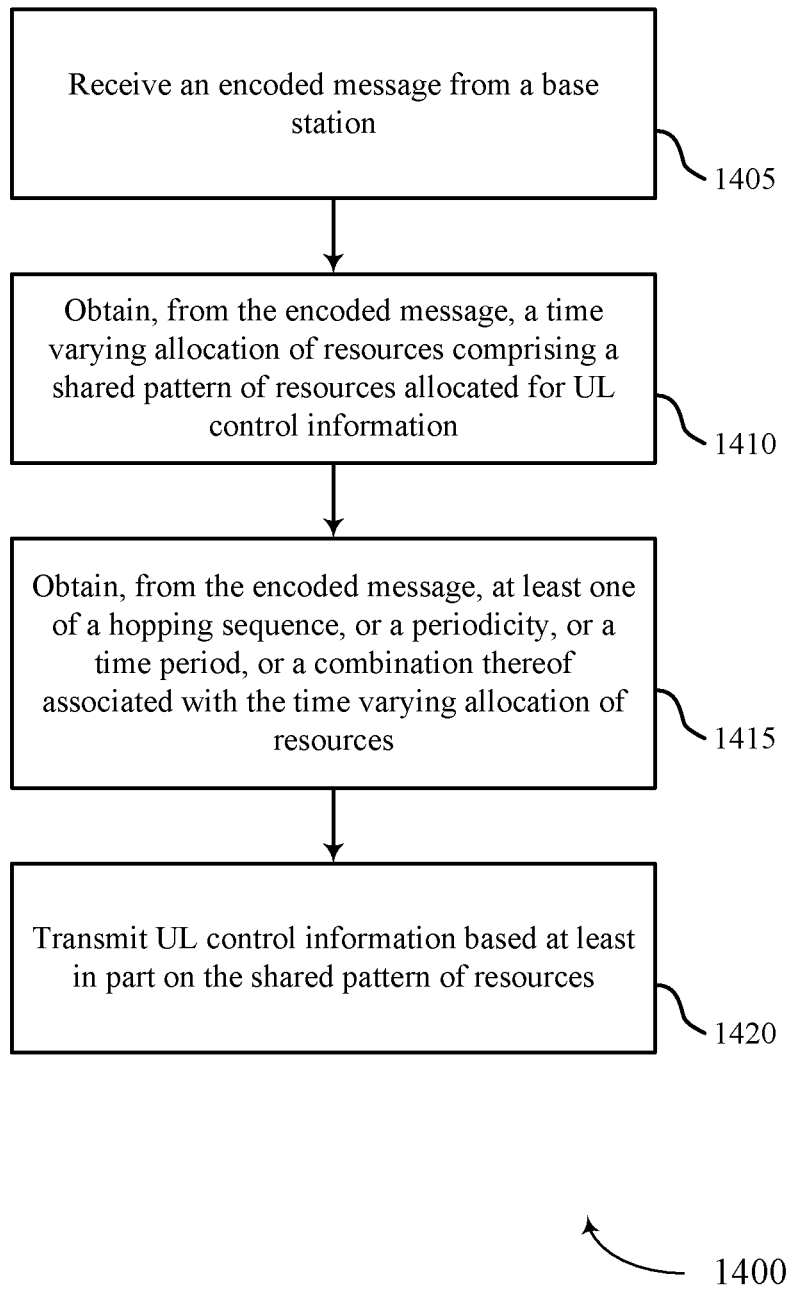

FIG. 14 shows a flowchart illustrating a method 1400 for uplink control channel scheduling for jamming resilience in accordance with various aspects of the present disclosure. The operations of method 1400 may be implemented by a device such as a UE 115 or its components as described with reference to FIGS. 1 through 5. For example, the operations of method 1400 may be performed by the UE uplink control manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may receive an encoded message from a base station as described above with reference to FIGS. 2 through 5. In certain examples, the operations of block 1405 may be performed by the encoded message component as described with reference to FIGS. 6 and 7.

At block 1410, the UE 115 may obtain, from the encoded message, a time varying allocation of resources including a shared pattern of resources allocated for uplink control information as described above with reference to FIGS. 2 through 5. In certain examples, the operations of block 1410 may be performed by the resource allocation component as described with reference to FIGS. 6 and 7.

At block 1415, the UE 115 may obtain, from the encoded message, at least one of a hopping sequence, or a periodicity, or a time period, or a combination thereof associated with the time varying allocation of resources as described above with reference to FIGS. 2 through 5. In certain examples, the operations of block 1415 may be performed by the encoded message component as described with reference to FIGS. 6 and 7.

At block 1420, the UE 115 may transmit uplink control information based at least in part on the shared pattern of resources as described above with reference to FIGS. 2 through 5. In certain examples, the operations of block 1420 may be performed by the uplink control component as described with reference to FIGS. 6 and 7.

Figure 15:
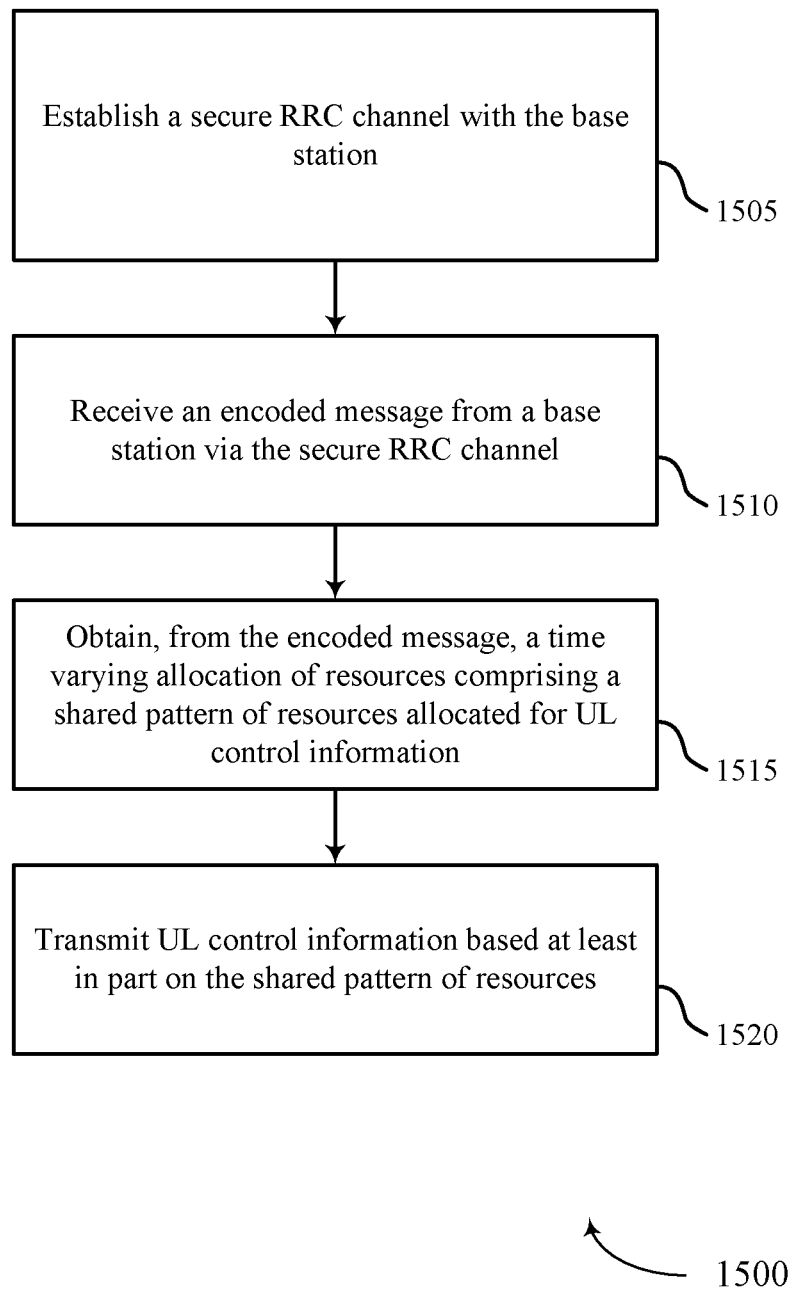

FIG. 15 shows a flowchart illustrating a method 1500 for uplink control channel scheduling for jamming resilience in accordance with various aspects of the present disclosure. The operations of method 1500 may be implemented by a device such as a UE 115 or its components as described with reference to FIGS. 1 through 5. For example, the operations of method 1500 may be performed by the UE uplink control manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may establish a secure RRC channel with the base station, as described above with reference to FIGS. 2 through 5. In certain examples, the operations of block 1505 may be performed by the secure RRC component as described with reference to FIGS. 6 and 7.

At block 1510, the UE 115 may receive an encoded message from a base station via the secure RRC channel as described above with reference to FIGS. 2 through 5. In certain examples, the operations of block 1510 may be performed by the encoded message component as described with reference to FIGS. 6 and 7.

At block 1515, the UE 115 may obtain, from the encoded message, a time varying allocation of resources including a shared pattern of resources allocated for uplink control information as described above with reference to FIGS. 2 through 5. In certain examples, the operations of block 1515 may be performed by the resource allocation component as described with reference to FIGS. 6 and 7.

At block 1520, the UE 115 may transmit uplink control information based at least in part on the shared pattern of resources as described above with reference to FIGS. 2 through 5. In certain examples, the operations of block 1520 may be performed by the uplink control component as described with reference to FIGS. 6 and 7.

Figure 16:
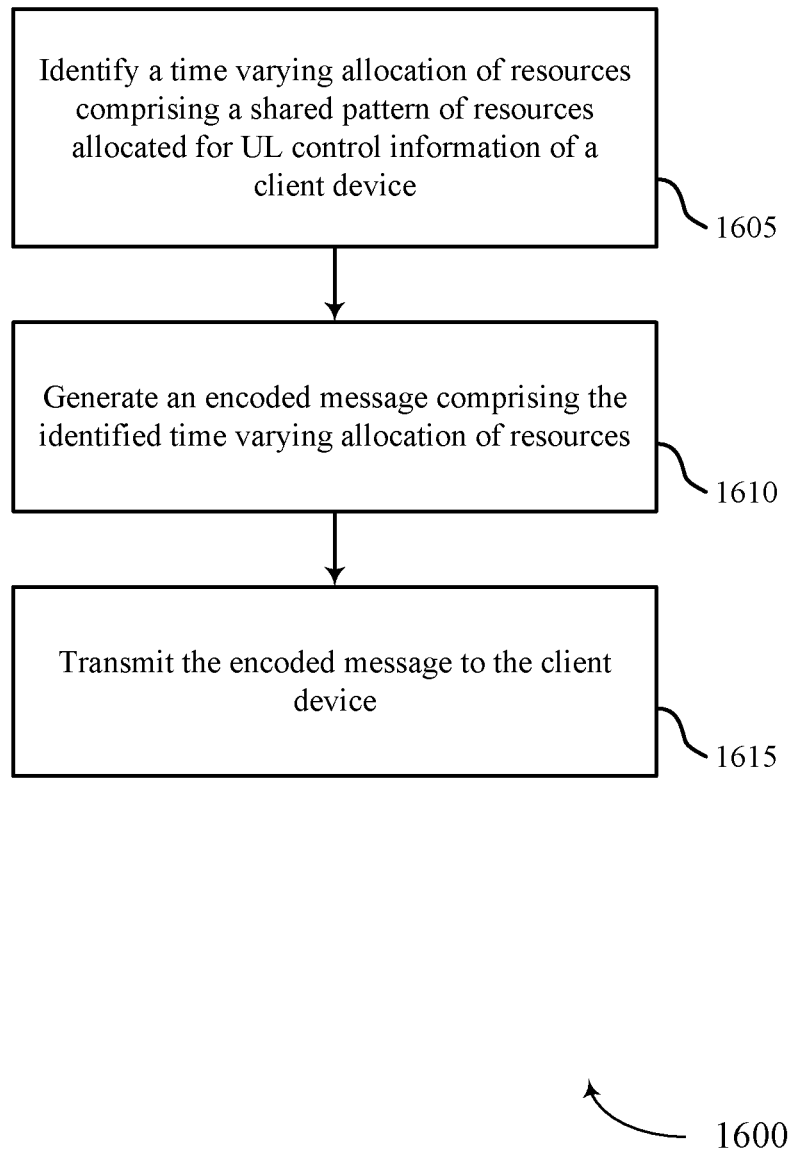

FIG. 16 shows a flowchart illustrating a method 1600 for uplink control channel scheduling for jamming resilience in accordance with various aspects of the present disclosure. The operations of method 1600 may be implemented by a device such as a base station 105 or its components as described with reference to FIGS. 1 through 5. For example, the operations of method 1600 may be performed by the base station uplink control manager as described herein. In some examples, the base station 105 may execute a set of codes to control the functional elements of the device to perform the functions described below. Additionally or alternatively, the base station 105 may perform aspects the functions described below using special-purpose hardware.

At block 1605, the base station 105 may identify a time varying allocation of resources including a shared pattern of resources allocated for uplink control information of a client device as described above with reference to FIGS. 2 through 5. In certain examples, the operations of block 1605 may be performed by the resource allocation component as described with reference to FIGS. 10 and 11.

At block 1610, the base station 105 may generate an encoded message including the identified time varying allocation of resources as described above with reference to FIGS. 2 through 5. In certain examples, the operations of block 1610 may be performed by the encoded message component as described with reference to FIGS. 10 and 11.

At block 1615, the base station 105 may transmit the encoded message to the client device as described above with reference to FIGS. 2 through 5. In certain examples, the operations of block 1615 may be performed by the encoded message component as described with reference to FIGS. 10 and 11.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for uplink control channel scheduling for jamming resilience.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (physical) locations.

Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the uplink transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for uplink control channel scheduling for jamming resilience. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one IC. In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication at a client device, the method comprising:
establishing a secure radio resource control (RRC) channel with a base station;
receiving an encoded message from the base station using the secure RRC channel, wherein the encoded message comprises one or more time varying allocations of resources for one or more client devices;
obtaining, from the encoded message, a time varying allocation of resources for the client device comprising a shared pattern of resources allocated for uplink control information; and
transmitting uplink control information based at least in part on the shared pattern of resources.

2. The method of claim 1, further comprising:
obtaining, from the encoded message, at least one of a hopping sequence, or a periodicity, or a time period, or a combination thereof associated with the time varying allocation of resources for the client device.

3. The method of claim 1, wherein receiving the encoded message from the base station comprises:
receiving an encrypted physical downlink control channel (PDCCH) message comprising the time varying allocation of resources for the client device.

4. The method of claim 3, wherein the time varying allocation of resources for the client device comprises resource allocation for at least one of a physical uplink control channel (PUCCH), or a physical uplink shared channel (PUSCH), or a combination thereof.

5. The method of claim 3, wherein obtaining the time varying allocation of resources for the client device comprises:
decrypting the encrypted PDCCH message using an encryption key.

6. The method of claim 5, wherein the encryption key is derived by the client device based at least in part on a key shared with the base station.

7. A method of wireless communication at a base station, the method comprising:
establishing a secure radio resource control (RRC) channel with one or more client devices;
identifying one or more time varying allocations of resources for the one or more client devices comprising a shared pattern of resources allocated for uplink control information;
generating an encoded message comprising the identified one or more time varying allocations of resources; and
transmitting the encoded message to the one or more client devices using the secure RRC channel.

8. The method of claim 7, further comprising:
identifying at least one of a hopping sequence, or a periodicity, or a time period, or a combination thereof associated with the one or more time varying allocations of resources, wherein the encoded message further comprises at least one of the identified hopping sequence, or the identified periodicity, or the identified time period, or a combination thereof.

9. The method of claim 7, wherein the one or more time varying allocations of resources comprises one or more resource blocks (RBs) allocated for transmission of uplink control information for the one or more client devices.

10. The method of claim 7, wherein transmitting the encoded message comprises:
transmitting, to the one or more client devices, an encrypted physical downlink control channel (PDCCH) message comprising the identified one or more time varying allocations of resources.

11. The method of claim 10, wherein the one or more time varying allocations of resources comprises resource allocation for at least one of a physical uplink control channel (PUCCH), or a physical uplink shared channel (PUSCH), or a combination thereof associated with the one or more client devices.

12. The method of claim 10, further comprising:
encrypting a PDCCH message using an encryption key to generate the encrypted PDCCH message.

13. The method of claim 12, wherein the encryption key is based at least in part on a key shared with the one or more client devices.

14. The method of claim 7, further comprising:
receiving uplink control information from the one or more client devices based at least in part on the identified one or more time varying allocations of resources, wherein the uplink control information comprises at least one of a scheduling request (SR), or an acknowledgement (ACK) message, or a negative ACK (NACK) message, or a channel state information (CSI), or a combination thereof.

15. An apparatus for wireless communication at a client device, the apparatus comprising:
a processor; and
memory, in electronic communication with the processor, storing instructions that, when executed by the processor, cause the apparatus to:
establish a secure radio resource control (RRC) channel with a base station;
receive an encoded message from the base station using the secure RRC channel, wherein the encoded message comprises one or more time varying allocations of resources for one or more client devices;
obtain, from the encoded message, a time varying allocation of resources for the client device comprising a shared pattern of resources allocated for uplink control information; and
transmit uplink control information based at least in part on the shared pattern of resources.

16. The apparatus of claim 15, wherein the instructions are operable to cause the processor to:
obtain, from the encoded message, at least one of a hopping sequence, or a periodicity, or a time period, or a combination thereof associated with the time varying allocation of resources for the client device.

17. The apparatus of claim 15, wherein receiving the encoded message from the base station comprises:
receiving an encrypted physical downlink control channel (PDCCH) message comprising the time varying allocation of resources for the client device.

18. The apparatus of claim 17, wherein obtaining the time varying allocation of resources for the client device comprises:
decrypting the encrypted PDCCH message using an encryption key.

19. The apparatus of claim 18, wherein the encryption key is derived by the client device based at least in part on a key shared with the base station.

20. An apparatus for wireless communication at a base station, the apparatus comprising:
a processor; and
memory, in electronic communication with the processor, storing instructions that, when executed by the processor, cause the apparatus to:
establish a secure radio resource control (RRC) channel with one or more client devices:
identify one or more time varying allocations of resources for the one or more client devices comprising a shared pattern of resources allocated for uplink control information;
generate an encoded message comprising the identified one or more time varying allocations of resources; and
transmit the encoded message to the one or more client devices using the secure RRC channel.

21. The apparatus of claim 20, wherein the instructions are operable to cause the processor to:
identify at least one of a hopping sequence, or a periodicity, or a time period, or a combination thereof associated with the one or more time varying allocations of resources, wherein the encoded message further comprises at least one of the identified hopping sequence, or the identified periodicity, or the identified time period, or a combination thereof.

22. The apparatus of claim 21, wherein the one or more time varying allocations of resources comprises one or more resource blocks (RBs) allocated for transmission of uplink control information for the one or more client devices.

23. The apparatus of claim 20, wherein the instructions are operable to cause the processor to:
transmit, to the one or more client devices, an encrypted physical downlink control channel (PDCCH) message comprising the identified one or more time varying allocations of resources.

24. The apparatus of claim 23, wherein the instructions are operable to cause the processor to:
encrypt a PDCCH message using an encryption key to generate the encrypted PDCCH message.

25. The apparatus of claim 24, wherein the encryption key is based at least in part on a key shared with the one or more client devices.

26. The apparatus of claim 20, wherein the instructions are operable to cause the processor to:
receive uplink control information from the one or more client devices based at least in part on the identified one or more time varying allocations of resources, wherein the uplink control information comprises at least one of a scheduling request (SR), or an acknowledgement (ACK) message, or a negative ACK (NACK) message, or a channel state information (CSI), or a combination thereof.

* * * * *